US008639432B2

(12) United States Patent
Matsuo et al.

(10) Patent No.: US 8,639,432 B2
(45) Date of Patent: Jan. 28, 2014

(54) ABNORMAL COMBUSTION DETECTION METHOD FOR SPARK-IGNITION ENGINE, AND SPARK-IGNITION ENGINE

(75) Inventors: Naoya Matsuo, Higashihiroshima (JP); Kouji Shishime, Hiroshima (JP); Motoo Hayakawa, Kure (JP); Hiroki Morimoto, Hiroshima (JP); Mikinori Ohashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 444 days.

(21) Appl. No.: 13/038,131

(22) Filed: Mar. 1, 2011

(65) Prior Publication Data

US 2011/0246049 A1 Oct. 6, 2011

(30) Foreign Application Priority Data

Mar. 31, 2010 (JP) .................................. 2010-080943

(51) Int. Cl.
*G01M 15/12* (2006.01)
*F02P 5/04* (2006.01)

(52) U.S. Cl.
USPC ..................................... 701/111; 123/406.11

(58) Field of Classification Search
USPC ............. 701/111, 102, 110, 115; 123/406.11, 123/406.12, 406.17, 406.22, 406.24, 406.35
See application file for complete search history.

(56) References Cited

U.S. PATENT DOCUMENTS

| 4,331,117 A | * | 5/1982 | Ginsburgh | ............... | 123/406.21 |
| 4,370,964 A | * | 2/1983 | Muranaka et al. | ....... | 123/406.35 |
| 6,105,552 A | | 8/2000 | Arisawa et al. | | |

FOREIGN PATENT DOCUMENTS

| JP | H11-247750 A | 9/1999 |
| JP | 2002-339780 A | 11/2002 |
| JP | 2006-046140 A | 2/2006 |

OTHER PUBLICATIONS

An Office Action; "Notice of Reasons for Rejection," issued by the Japanese Patent Office on Nov. 5, 2013, which corresponds to Japanese Patent Application No. 2011-080196 and is related to U.S. Appl. No. 13/038,131; with summary.

* cited by examiner

*Primary Examiner* — Hieu T Vo
(74) *Attorney, Agent, or Firm* — Studebaker & Brackett PC

(57) ABSTRACT

When a maximum value of vibration intensity (maximum vibration intensity)(Vmax) acquired from a vibration sensor (33) in a low engine speed/high engine load (operating region (R)) is equal to or greater than a given threshold value (X), a spark timing of a spark plug (16) is shifted from a point set in a normal state on a retard side with respect to a compression top dead center, farther toward the retard side. Then, when a maximum vibration intensity (Vmax2) acquired after the spark timing retard is greater than a maximum vibration intensity (Vmax1) acquired before the spark timing retard, it is determined that preignition occurs. This technique makes it possible to reliably detect preignition using the vibration sensor, while distinguishing the preignition from knocking. An in-cylinder pressure sensor for detecting an in-cylinder pressure of an engine may be used to determine the presence or absence of the preignition, in the same manner.

7 Claims, 15 Drawing Sheets

ABNORMAL COMBUSTION DETECTION METHOD FOR SPARK-IGNITION ENGINE, AND SPARK-IGNITION ENGINE

BACKGROUND OF THE INVENTION

1. Field of the Invention

The present invention relates to a method for detecting abnormal combustion in a spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center (top dead center of a compression stroke), in a low engine speed/high engine load region and in a normal state where no abnormal combustion occurs. The present invention also relates to a spark-ignition engine using the method.

2. Description of the Background Art

Heretofore, in a spark-ignition engine equipped with a spark plug, it has been implemented to provide an ion current sensor (sensor for detecting an ion current generated by combustion of an air-fuel mixture) in a combustion chamber, and detect postignition and preignition which are likely to occur during an engine operation, based on a detection value of the ion current sensor, as disclosed, for example, in JP 2006-46140A (hereinafter referred to as "Patent Document 1").

According to the Patent Document 1, the postignition is defined as a phenomenon that an air-fuel mixture is ignited almost without a delay with respect to a spark timing (spark ignition timing) of the spark plug. Specifically, in normal combustion, an air-fuel mixture is ignited after a given delay time (ignition delay (lag) time) from the spark timing, whereas, in the event of the postignition, an air-fuel mixture self-ignites at a timing almost without the ignition delay time. On the other hand, the preignition is defined as a phenomenon that an air-fuel mixture self-ignites before the spark timing, i.e., self-ignition occurs at a timing earlier than that in the postignition.

In other words, in the Patent Document 1, self-ignition of an air-fuel mixture occurring at a timing later than the spark timing is defined as postignition, and self-ignition of an air-fuel mixture occurring at a timing earlier than the spark timing is defined as preignition. Although the postignition is mild in terms of severity of abnormal combustion as compared with the preignition, it can be said that the postignition is a premonitory phenomenon leading to the preignition. Specifically, once the postignition occurs, a self-ignition timing will rapidly become earlier, and a risk of developing into the preignition will become higher.

If the postignition develops into the preignition, intense noise and vibration occur, and prolonged continuation of this phenomenon is likely to cause damage to a piston, etc. As above, the preignition is unignorable serious abnormal combustion. Therefore, it is desired to detect a combustion abnormality as early as possible to prevent the preignition from occurring.

For this purpose, in the Patent Document 1, the ion current sensor is used to firstly determine whether the postignition occurs. More specifically, a timing of a peak (peak timing) of a combustion ion current is identified based on a detection value of the ion current sensor, and the presence or absence of the occurrence of the postignition is determined based on whether the peak timing advances from a reference timing by a given amount or more. Then, when the occurrence of the postignition is ascertained, a certain control operation for suppressing the postignition (e.g., a control operation of increasing a fuel injection amount) is executed even before the postignition develops into the preignition.

According to the Patent Document 1, self-ignition occurring after the spark timing is defined as "postignition", and self-ignition occurring before the spark timing is defined as "preignition", as mentioned above. However, there is no difference between the postignition and the preignition, in that they are a phenomenon that an air-fuel mixture self-ignites at a premature timing with respect to a normal combustion initiation timing (a time point when a given delay time has elapsed from a spark timing). Thus, in this specification, the postignition and the preignition will hereinafter be referred to collectively as "preignition", without distinguishing therebetween.

Meanwhile, in cases where the ion current sensor is used to detect the preignition as in the engine disclosed in the Patent Document 1, it is likely that the preignition cannot be accurately detected in some situations. For example, the Patent Document 1 discloses a technique of using the spark plug as the ion current sensor. In this case, due to impossibility to detect an ion current during a spark discharge, or influence of LC resonance noise in an electric circuit, etc., it becomes difficult to adequately detect a combustion ion current, which is likely to cause a risk of missing the preignition.

JP 2002-339780A (hereinafter referred to as "Patent Document 2") discloses a technique of detecting the preignition using a vibration sensor for detecting vibration of an engine. More specifically, in the Patent Document 2, the vibration sensor is used to identify a vibration intensity and a vibration occurrence timing of vibration occurring in an engine body, wherein, when the vibration intensity is greater than a given allowable value, and the vibration occurrence timing is on an advance side with respect to a spark timing, it is determined that the preignition occurs.

In cases where the vibration sensor is used to detect the preignition as in the Patent Document 2, it is possible to solve the above problems (restriction on detection during a spark discharge, etc.) which are likely to occur when the ion current sensor is used to detect the preignition. In addition, the vibration sensor is advantageous in terms of cost, because it has heretofore been widely used to detect knocking.

However, in the technique of simply identifying the vibration intensity and the vibration occurrence timing using the vibration sensor as in the Patent Document 2, there is a problem that the preignition cannot be detected unless it develops into a serious level where large vibration occurs at a timing earlier than a spark timing. Specifically, in cases where vibration occurs at a timing later than a spark timing, there is a possibility that a cause for the vibration is not the preignition (phenomenon that an air-fuel mixture prematurely self-ignites) but knocking (phenomenon that an unburned air-fuel mixture self-ignites after initiation of combustion). Thus, in order to clearly determine that the preignition occurs, it is necessary to wait until the preignition develops into a serious level where vibration occurs at a timing earlier than the spark timing. This is undesirable in terms of reliability, durability, etc., of an engine.

The preignition can also be detected using an in-cylinder pressure sensor for detecting an in-cylinder pressure of an engine, in the same manner as that in the above technique using the vibration sensor. Specifically, when a high in-cylinder pressure greater than an allowable value is detected at a premature timing, it may be determined that the preignition occurs. However, in this case, there is also a situation where it is impossible to detect the preignition while distinguishing it from knocking, unless a level of the preignition becomes fairly serious.

SUMMARY OF THE INVENTION

In view of the above circumstances, it is an object of the present invention to provide a method capable of adequately detecting preignition which is likely to occur during operation of a spark-ignition engine, while distinguishing it from knocking, using a vibration sensor or an in-cylinder pressure sensor, and a spark-ignition engine using the method.

In order to achieve the above object, the present invention provides a method for detecting abnormal combustion in a spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center, in a low engine speed/high engine load region and in a normal state where no abnormal combustion occurs. The method comprises the steps of: determining whether a maximum value of a vibration intensity acquired from the vibration sensor or a maximum value of an in-cylinder pressure acquired from the in-cylinder pressure sensor, in the low engine speed/high engine load region, is equal to or greater than a given threshold value; when the maximum value of the vibration intensity or the maximum value of the in-cylinder pressure is equal to or greater than the threshold value, shifting the spark timing of the spark plug from the point set in the normal state on the retard side with respect to the compression top dead center, farther toward the retard side; and when a post-spark retard maximum detection value is greater than a pre-spark retard maximum detection value, determining that preignition occurs which is a phenomenon that an air-fuel mixture prematurely self-ignites, where: the post-spark retard maximum detection value is the maximum value of the vibration intensity or the maximum value of the in-cylinder pressure, which is acquired from the vibration sensor or the in-cylinder pressure sensor after the retard of the spark timing; and the pre-spark retard maximum detection value is the maximum value of the vibration intensity or the maximum value of the in-cylinder pressure, which is acquired before the retard of the spark timing.

The present invention also provides a spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center, in a low engine speed/high engine load region and in a normal state where no abnormal combustion occurs. The spark-ignition engine comprises a controller operable to control the spark timing of the spark plug and accept information about a vibration intensity detected by the vibration sensor or information about an in-cylinder pressure detected by the in-cylinder pressure sensor. The controller is operable, when a maximum value of the vibration intensity acquired from the vibration sensor or a maximum value of the in-cylinder pressure acquired from the in-cylinder pressure sensor, in the low engine speed/high engine load region, is equal to or greater than a given threshold value, to execute a control operation of shifting the spark timing of the spark plug from the point set in the normal state on the retard side with respect to the compression top dead center, farther toward the retard side. And the controller is operable, when a post-spark retard maximum detection value is greater than a pre-spark retard maximum detection value, to determine that preignition occurs which is a phenomenon that an air-fuel mixture prematurely self-ignites, where: the post-spark retard maximum detection value is the maximum value of the vibration intensity or the maximum value of the in-cylinder pressure, which is acquired from the vibration sensor or the in-cylinder pressure sensor after the retard of the spark timing; and the pre-spark retard maximum detection value is the maximum value of the vibration intensity or the maximum value of the in-cylinder pressure, which is acquired before the retard of the spark timing.

BRIEF DESCRIPTION OF THE DRAWINGS

FIG. 15B illustrates a fuel injection timing in the event of the preignition.

DESCRIPTION OF THE PREFERRED EMBODIMENTS (1) Overall Structure of Engine

Figure 1:
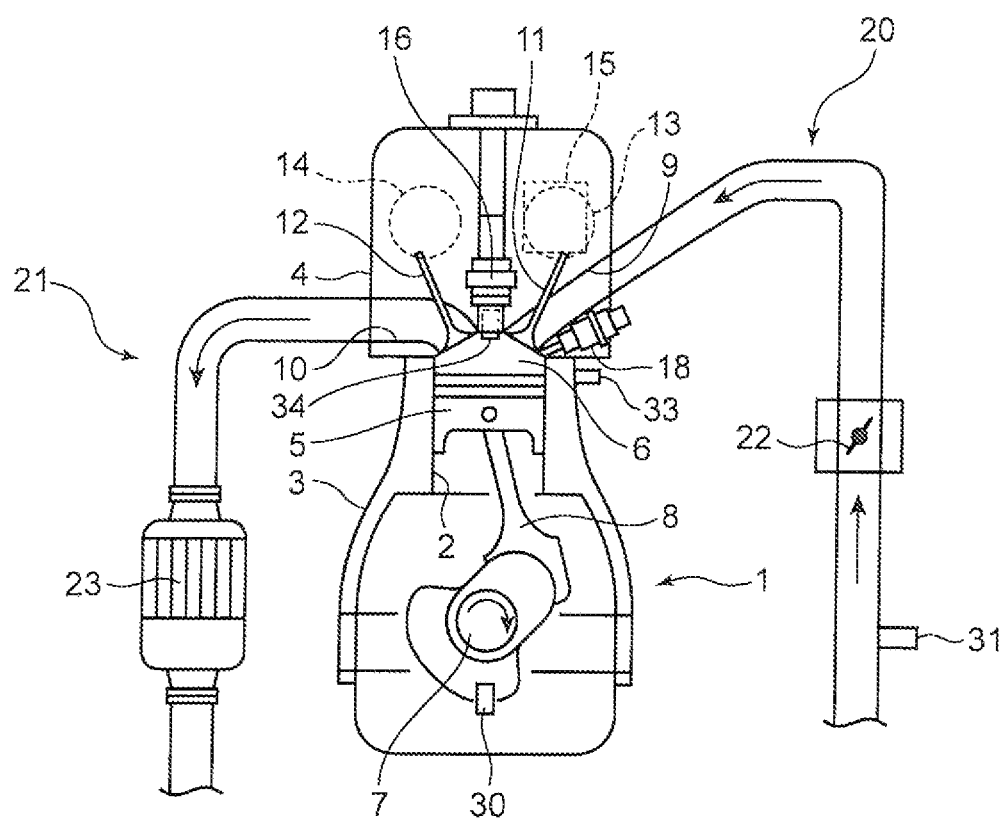
FIG. 1 is a schematic diagram showing an overall structure of a spark-ignition engine according to one embodiment of the present invention.

FIG. 1 is a schematic diagram showing an overall structure of a spark-ignition engine according to one embodiment of the present invention. The engine illustrated in FIG. 1 is a reciprocating piston-type multicylinder gasoline engine which is mounted in a vehicle as a power source for driving of vehicle running. An engine body 1 of the engine comprises a cylinder block 3 having a plurality of cylinders 2 arranged side-by-side in a direction perpendicular to a surface of the drawing sheet (In FIG. 1, only one of the cylinders 2 is illustrated), a cylinder head 4 provided on an upper surface of the cylinder block 3, and a plurality of pistons 5 each inserted in a perspective one of the cylinders 2 in a reciprocatingly slidable manner. Fuel to be supplied to the engine body 1 may be any type consisting mainly of gasoline. For example, the fuel may consist only of gasoline, or may comprise gasoline and ethanol (ethyl alcohol) or the like contained in the gasoline.

Each of the pistons 5 is connected to a crankshaft 7 through a respective one of a plurality of connecting rods 8, in such a manner that the crankshaft 7 is rotated about its central axis according to a reciprocating movement of the piston 5.

In each of the cylinders 2, a combustion chamber 6 is defined above the piston 5. An intake port 9 and an exhaust port 10 are opened to the combustion chamber 6, and an intake valve 11 and an exhaust valve 12 are provided to the cylinder head 4 to open and close respective ones of the intake and exhaust ports 9, 10. Each of the intake valve 11 and the exhaust valve 12 is adapted to be driven in an openable/closable manner by a respective one of two valve operating mechanisms 13, 14 including a pair of camshafts (illustration is omitted) installed in the cylinder head 4, in conjunction with the rotation of the crankshaft 7.

A VVT mechanism 15 is incorporated in the valve operating mechanism 13 for the intake valve 11. The VVT mechanism 15 stands for Variable Valve Timing mechanism which is a mechanism for variably setting an operating timing of the intake valve 11.

As the VVT mechanism 15, various types have already been put to practical use and publicly known. For example, a hydraulic type may be used as the VVT mechanism 15. Although illustration is omitted, the hydraulic-type VVT mechanism comprises a driven shaft disposed in concentric relation to the camshaft for the intake valve 11, and a plurality of hydraulic chambers disposed between the camshaft and the driven shaft and arranged side-by-side along a circumferential direction, wherein it is adapted to provide a given pressure difference between the hydraulic chambers so as to generate a phase difference between the camshaft and the driven shaft. Based on the above structure, the hydraulic-type VVT mechanism is operable to variably set the phase difference within a given angular range so as to continuously change the operating timing of the intake valve 11.

Alternatively, a type designed to change a valve lift amount so as to change a closing timing of the intake valve may be provided as the VVT mechanism 15. Further, this variable valve lift mechanism may be used in combination with the above variable phase shift mechanism.

The cylinder head 4 of the engine body 1 is provided with a spark plug 16 and an injector 18 in pairs for each of the cylinders 2.

The injector 18 is provided to be exposed to the combustion chamber 6 from a lateral side of an intake-side region thereof, and adapted to receive fuel (gasoline) from a non-illustrated fuel supply pipe, and inject the fuel from a distal end thereof into the combustion chamber 6. Specifically, the injector 18 is operable to inject the fuel into the combustion chamber 6, for example, in an intake stroke of the engine, so as to mix the injected fuel with air to form an air-fuel mixture having a desired air/fuel ratio in the combustion chamber 6.

The spark plug 16 is provided to be exposed to the combustion chamber 6 from thereabove, and adapted to generate a spark discharge at a distal end thereof in response to power feeding from a non-illustrated ignition circuit. Specifically, the spark plug 16 is operable to generate a spark discharge at a given spark timing set around a compression top dead center (compression TDC) so as to trigger initiation of combustion of the air-fuel mixture.

The cylinder block 3 is provided with an engine speed sensor 30 for detecting a rotation speed of the crankshaft 7 as an engine speed.

The cylinder block 3 is further provided with a vibration sensor 33 for detecting vibration of the cylinder block 3. A detection value of the vibration sensor 33 is used to detect abnormal combustion which occurs in the engine.

More specifically, in this embodiment, two types of abnormal combustions: knocking and preignition, are detected based on a detection value of the vibration sensor 33. As used herein, the term "knocking" means a phenomenon that, in a course of flame propagation after initiation of combustion of an air-fuel mixture triggered by spark ignition (spark discharge), an unburned portion (end gas) of the air-fuel mixture self-ignites. On the other hand, the term "preignition" means a phenomenon that an air-fuel mixture self-ignites at a timing earlier than a normal initiation timing of combustion (normal combustion initiation timing) triggered by the spark ignition (i.e., the air-fuel mixture self-ignites irrespective of the spark ignition). When the knocking or the preignition occurs, relatively large vibration occurs in the cylinder block 3 due to rapid changes in combustion pressure, etc. Thus, in this embodiment, such vibration of the cylinder block 3 is analyzed based on a detection value of the vibration sensor 33 to detect the knocking or the preignition.

An ion current sensor 34 is provided at a position adjacent to the spark plug 16 to detect a flame formed by combustion of an air-fuel mixture in the combustion chamber 6. The ion current sensor 34 has an electrode to which a bias voltage, for example, of about 100 V, is applied, wherein it is adapted to detect an ion current generated when a flame is formed around the electrode, so as to detect the flame.

As with the vibration sensor 33, the occurrence of the preignition can be detected by detecting a flame using the ion current sensor 34. Specifically, in cases where an air-fuel mixture is forcibly combusted by spark ignition, when a combustion state is normal, combustion will be initiated after a given delay time from a timing of the spark ignition (spark timing). However, in the event of the preignition, an air-fuel mixture prematurely self-ignites, irrespective of the spark ignition, so that combustion is undesirably initiated at a timing earlier than the normal combustion initiation timing (a time point when the given delay time has elapsed from the spark ignition). Thus, when a timing of a flame detection by the ion current sensor 34 (flame formation timing) is excessively early as compared to the normal combustion initiation timing, it is determined that the preignition occurs. As above, in this embodiment, as a sensor for detecting the preignition, two type of sensors: the ion current sensor 34 and the vibration sensor 33, are provided so as to allow the preignition to be more reliably detected using the two types of sensors.

However, abnormal combustion detectable using the ion current sensor 34 is only the preignition, and the ion current sensor 34 is incapable of detecting the knocking. Specifically, the knocking is a phenomenon that, in a course of flame propagation after flame formation triggered by the spark ignition, an unburned portion (end gas) of an air-fuel mixture self-ignites, as mentioned above. Thus, even if the knocking occurs, a timing of the flame formation will be normally maintained. Therefore, it is impossible to identify the presence or absence of the knocking by analyzing a flame formation timing from the ion current sensor 34. For this reason, the knocking is detected by using only a detection value of the vibration sensor 33, without using the ion current sensor 34.

An intake passage 20 and an exhaust passage 21 are connected to respective ones of the intake port 9 and the exhaust port 10 of the engine body 1. Specifically, external intake air (flesh air) is supplied to the combustion chamber 6 via the intake passage 20, and burned gas (exhaust gas) produced in the combustion chamber 6 is discharged to an outside of the engine via the exhaust passage 21.

The intake passage 20 is provided with a throttle valve 22 for adjusting a flow rate of intake air flowing into the engine body 1, and an airflow sensor 31 for detecting the flow rate of intake air.

The throttle valve 22 is comprised of an electronically-controlled throttle valve adapted to be electrically driven in an openable/closable manner according to an angle of a non-illustrated accelerator pedal to be operated (depressed) by a driver. Specifically, the accelerator pedal is provided with an accelerator-pedal angle sensor 32 (FIG. 2), and the throttle valve 22 is adapted to be driven in an openable/closable manner by a non-illustrated electric actuator, according to an accelerator-pedal angle detected by the accelerator-pedal angle sensor 32.

The exhaust passage 21 is provided with a catalytic converter 23 for purifying exhaust gas. For example, the catalytic converter 32 houses a three-way catalyst to purify harmful components contained in exhaust gas passing through the exhaust passage 21 by an action of the three-way catalyst.

(2) Control System

Figure 2:
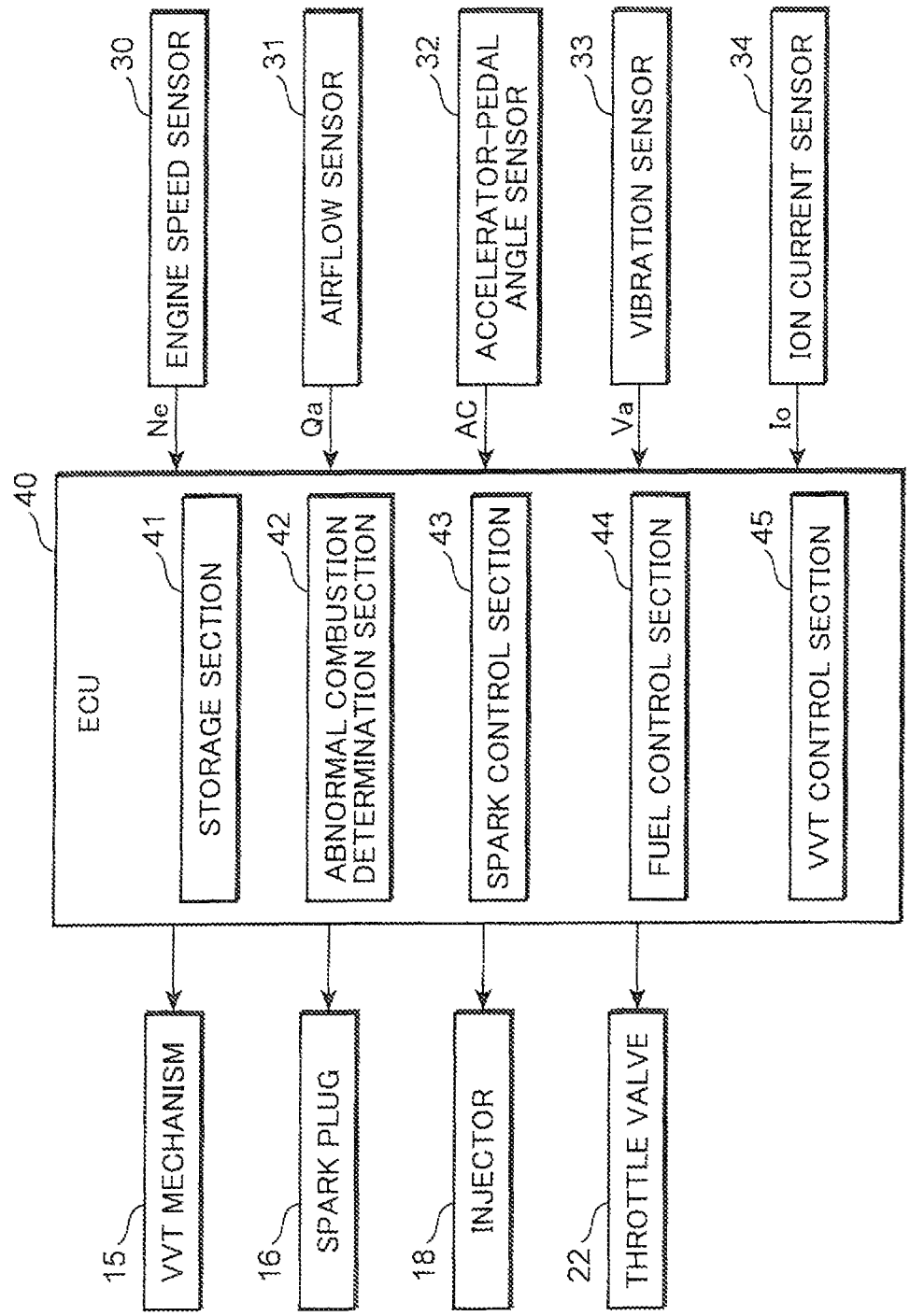
FIG. 2 is a block diagram showing a control system of the engine.

FIG. 2 is a block diagram showing a control system of the engine. An ECU 40 illustrated in FIG. 2 is a controller for comprehensively controlling various sections of the engine, and comprised of conventional components, such as a CPU, a ROM and a RAM.

A plurality of detection signals from various sensors are input into the ECU 40. Specifically, the ECU 40 is electrically connected to each of the engine speed sensor 30, the airflow sensor 31, the accelerator-pedal angle sensor 32, the vibration sensor 33 and the ion current sensor 34, and adapted to successively receive an input of information such as an engine speed Ne, an intake air amount Qa, an accelerator-pedal angle AC, a vibration intensity (vibration acceleration) Va, an ion current value Io, as respective detection values of the sensors 30 to 34.

Further, the ECU 40 is electrically connected to each of the VVT mechanism 15, the spark plug 16, the injector 18 and the throttle valve 22, and adapted to output a driving control signal to each of these components.

Specific functions of the ECU 40 will be described below. As major functional elements, the ECU 40 has a storage section 41, an abnormal combustion determination section 42, a spark control section 43, a fuel control section 44, and a VVT control section 45.

Figure 3:
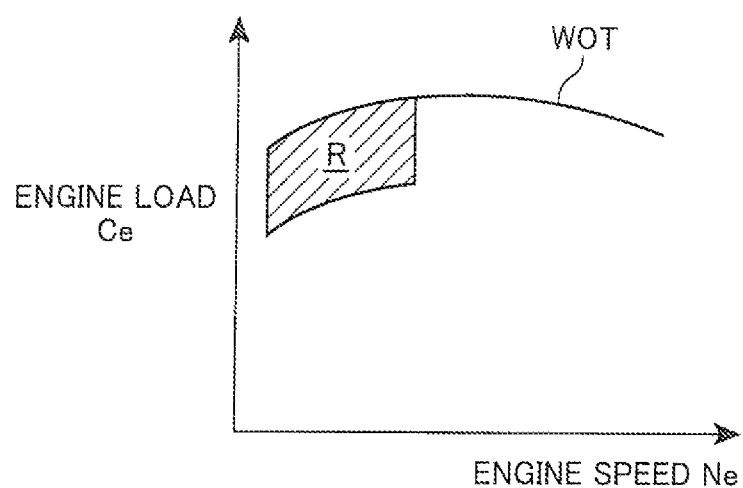
FIG. 3 is a graph showing a specific operating region having a risk of the occurrence of preignition.

The storage section 41 is provided as a means to store various data and programs necessary for controlling the engine. As one example of the data, a control map for defining a specific operating region R illustrated in FIG. 3 is stored in the storage section 41. The specific operating region R is an engine operating region having a risk of the occurrence of the preignition, and set in a vicinity of a maximum engine load (WOT: Wide Open Throttle) line (i.e., in a high engine load region) and on the side of a low engine speed region.

Specifically, the preignition is a phenomenon that an air-fuel mixture self-ignites at a timing earlier than a normal combustion initiation timing (a normal initiation timing of combustion triggered by spark ignition), as mentioned above. Thus, the preignition is most likely to occur in a low engine speed/high engine load region where air in the combustion chamber 6 has a high temperature and a high pressure, and a time period during which fuel receives heat from the air (heat receiving period for fuel) becomes longer. Therefore, as shown in FIG. 3, the specific operating region R having a risk of the occurrence of the preignition is set in a region where the engine speed Ne is relatively low and an engine load Ce is relatively high.

The abnormal combustion determination section 42 is provided as a means to determine the presence or absence of the occurrence of the preignition or the knocking, based on respective detection values of the vibration sensor 33 and the ion current sensor 34. More specifically, the abnormal combustion determination section 42 is operable, when an engine operating state is in the specific operating region R, to identify a flame formation timing based on a detection value (ion current value Io) of the ion current sensor 34, and compare the flame formation timing with the normal combustion initiation timing to determine whether the preignition occurs. Further, the abnormal combustion determination section 42 is operable to analyze a maximum vibration intensity value and an occurrence timing thereof, based on a detection value (vibration intensity Va) of the vibration sensor 33, to determine which of the preignition and the knocking occurs (as for details of this operation, see the after-mentioned Section (3)).

The spark control section 43 is provided as a means to output a power feed signal to the ignition circuit of the spark plug 16 at a given timing preliminarily set depending on the engine operating state so as to control a timing of the spark discharge (spark timing) of the ignition plug 16, etc.

For example, in the specific operating region R set in the low engine speed/high engine load region, the spark plug 16 is controlled to perform spark ignition (generate a spark discharge) at a timing which is slightly late with respect to the compression TDC (compression top dead center). However, when vibration having a given level or more is detected in the specific operating region R and input from the vibration sensor 33 into the ECU 40, the spark control section 43 is operable to shift the spark timing from the above point (timing which is slightly late with respect to the compression TDC), farther toward a retard side. This is intended to determine by which of the preignition and the knocking the vibration input from the vibration sensor 33 at the given level or more is caused.

Specifically, the spark timing retard has an effect of suppressing the knocking, but it has no particular effect on the preignition (this reason will be described in detail later). Thus, the spark control section 43 is operable, when vibration having a given level or more occurs, to intentionally retard the spark timing so as to determine by which of the preignition and the knocking the vibration is caused. Then, the abnormal combustion determination section 42 is operable to analyze a change in vibration after the spark timing retard, and determine which of the preignition and the knocking occurs, based on a result of the analysis.

The fuel control section 44 is provided as a means to control an injection amount and an injection timing of fuel to be injected from the injector 18 into the combustion chamber 6. More specifically, the fuel control section 44 is operable to calculate a target fuel injection amount and a target fuel injection timing, based on information about the engine speed Ne input from the engine speed sensor 30 and the intake air amount Qa input from the airflow sensor 31, and control a valve opening timing and a valve opening period of the injector 18, based on a result of the calculation.

Particularly, when the preignition is detected in the specific operating region R, the fuel control section 44 is operable to execute a control operation of increasing the fuel injection amount from the injector 18 to enrich an in-cylinder air/fuel ratio. This control operation is intended to inject a relatively large amount of fuel so as to lower an in-cylinder temperature to suppress the occurrence of the preignition. Further, according to need, the fuel control section 44 is operable to execute a control operation of delaying an injection timing of a part of injection fuel, i.e., fuel to be originally injected in the intake stroke, and inject the part of injection fuel in a late phase of the (subsequent) compression stroke (i.e., inject fuel in the intake stroke and in the compression stroke in a split manner). This makes it possible to lower the in-cylinder temperature, particularly, around the compression TDC, and shorten the heat receiving period of fuel, so as to create an environment where the preignition is less likely to occur.

The VVT control section 45 is provided as a means to drive the VVT mechanism 15 in such a manner as to shift the closing timing of the intake valve 11 (hereinafter referred to as "intake valve closing timing" or "IVC timing") to variably set an effective compression ratio of the engine. Specifically, the intake valve closing (IVC) timing is normally set adjacent to a bottom dead center of the intake stroke (intake BDC) and on a retard side with respect to the intake BDC (specifically, at a timing slightly beyond the intake BDC). Based on the IVC timing set in this manner, it becomes possible to almost prevent air introduced into the combustion chamber 6 from being blown back into the intake port 9, so that a substantial compression ratio (effective compression ratio) of the engine is set to a value close to a geometrical compression ratio of the engine. In contrast, when the IVC timing is set to a point which is significantly late with respect to the intake BDC, a fairly large amount of blowback of intake air will occur, which causes a reduction in the effective compression ratio of the engine accordingly. The VVT control section 45 is operable to drive the VVT mechanism 15 in such a manner as to controllably increase and reduce a retard amount of the IVC timing to variably set the effective compression ratio of the engine.

Particularly, the VVT control section 45 is operable, when the preignition is detected in the specific operating region R, to retard the IVC timing to reduce the effective compression ratio, according to need. This makes it possible to mainly lower an in-cylinder pressure (internal pressure of the combustion chamber 6) so as to suppress the preignition.

The term "intake valve closing (IVC) timing" in the above description is a closing timing on an assumption that an interval of a lift curve, except for ramp areas (buffer areas where a lift amount gently rises and falls), is defined as a valve opening period. Thus, it does not mean a timing when a lift amount of the intake valve 11 strictly becomes zero.

(3) Technique of Determining Preignition and Knocking

The following description will be made about a more specific process to be executed when the abnormal combustion determination section 42 determines the occurrence of the preignition and the knocking.

Figure 4:
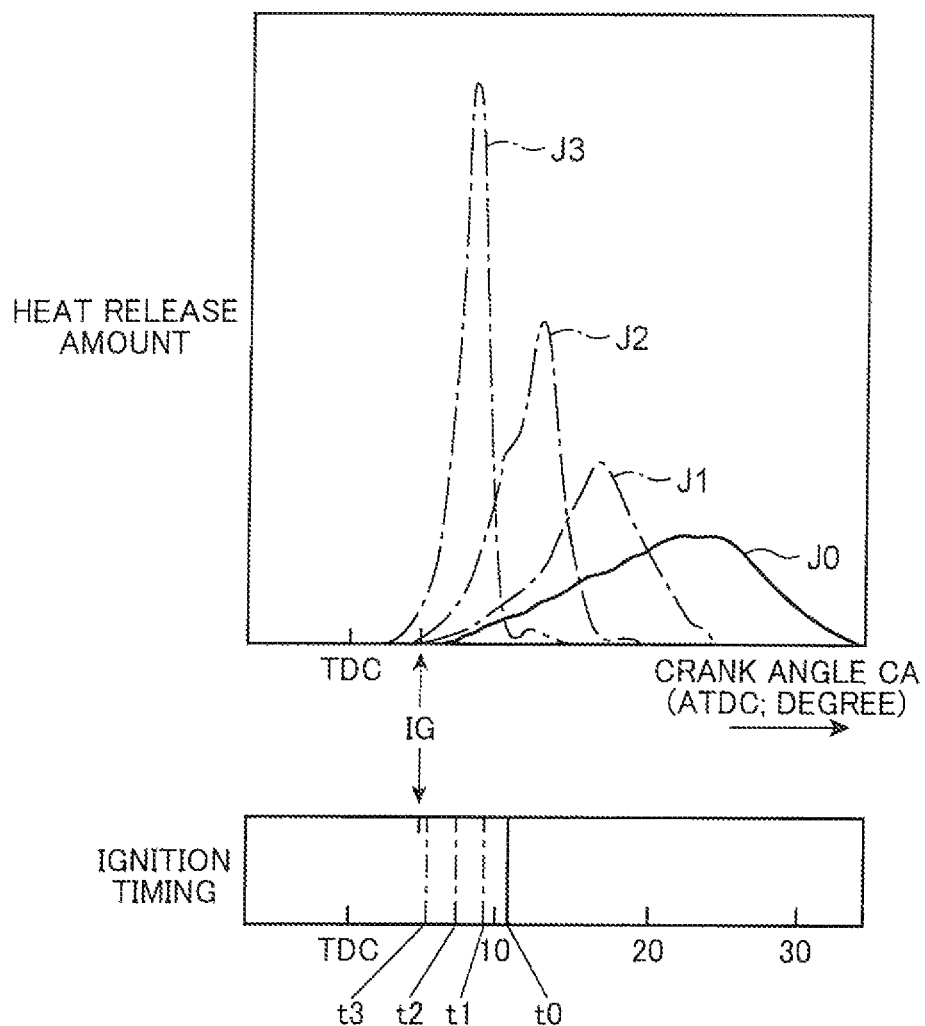
FIG. 4 is a chart showing distributions (temporal changes) of heat release amounts in the event of the preignition and in a normal combustion state.

Firstly, a process to be executed when the preignition is detected using the ion current sensor 34 will be described. FIG. 4 is a chart showing distributions (temporal changes) of heat release amounts in the event of the preignition and in a normal combustion state. In FIG. 4, the code "IG" indicates spark ignition (spark discharge), and a heat release amount during normal combustion triggered by the spark ignition IG is shown as the solid waveform J0. A timing of the spark ignition IG in the specific operating region R having a risk of the occurrence of the preignition is set to a point slightly late with respect to the compression TDC, as mentioned above. Thus, a crank-angle position of the spark ignition IG in FIG. 4 is set on a retard side with respect to the compression TDC (in FIG. 4, TDC). In the illustrated embodiment, the spark ignition IG is set at about 5 degrees crank angle (CA) after the compression TDC (5 degrees CA ATDC).

In the waveform J0 during normal combustion triggered by the spark ignition IG, t0 indicates a point when combustion progresses to a level where a flame can be detected by the ion current sensor 34 (i.e., a substantial combustion initiation timing). The point t0 is late with respect to the point of the spark ignition IG by a given crank angle. Specifically, in the normal combustion state, combustion will gradually expand from a flame kernel created by the spark ignition, toward a periphery of the combustion chamber 6. Thus, the substantial combustion initiation timing t0 becomes later than the timing of the spark ignition IG to some extent.

On the other hand, a distribution of a heat release amount in the event of the preignition is indicated by the dashed-dotted waveforms J1 to J3. The waveform J1, the waveform J2 and the waveform J3 indicate mild preignition, medium preignition and serious preignition, respectively, wherein respective crank-angle positions of substantial combustion initiation timings t1, t2, t3 of the three types of preignitions are offset on an advance side with respect to the normal combustion initiation timing t0. This means that, once the preignition occurs, it becomes impossible to control combustion by the spark ignition, due to self-ignition of an air-fuel mixture, and combustion will be initiated at a timing earlier than the normal combustion initiation timing t0. Moreover, along with progress toward earlier combustion initiation timing, a combustion process becomes steeper or more rapid, and a combustion period becomes shorter.

Further, the preignition has a characteristic that, if it is left without control, the mild preignition (J1) will gradually develop into the serious preignition (J3). Specifically, once the preignition occurs, an internal temperature of the combustion chamber 6 becomes acceleratedly higher to create an environment where the preignition is more likely to occur, so that the preignition will develop in a chain reaction manner. Particularly, if the preignition develops into the serious preignition (J3), the combustion process becomes extremely rapid to cause fairly large noise and vibration in an engine, which leads to damage of a piston, etc.

Thus, it is necessary to adequately detect the occurrence of the preignition at least before it develops into the serious preignition, and take required measures (e.g., enrichment of an air/fuel ratio). Therefore, in this embodiment, as a way to detect the preignition, a flame is detected using the ion current sensor 34, and the presence or absence of the occurrence of the preignition is determined based on a detection timing of the flame (flame formation timing). More specifically, when the ion current sensor 34 detects a flame at a timing earlier than the normal combustion initiation timing t0 by a given time, it is determined that the flame is caused by the preignition. In this process, in order to detect the preignition when it is at a level as close to mild as possible, it is preferable that the determination on the occurrence of the preignition is made when a flame detection timing by the ion current sensor 34 becomes earlier and comes close, for example, to the point t1.

Meanwhile, the occurrence of the preignition can be detected not only by using the ion current sensor 34, but also by using the vibration sensor 33, as mentioned above. In this embodiment, the vibration sensor 33 is used to detect not only the preignition but also the knocking. A detection process using the vibration sensor 33 will be described below.

Figure 5:
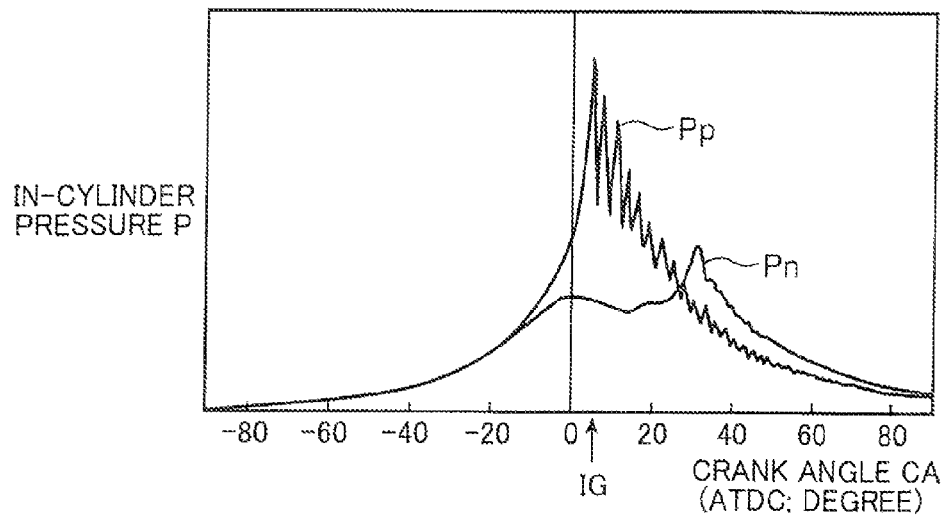
FIG. 5 is a chart showing a change in in-cylinder pressure in the event of the preignition, and a change in in-cylinder pressure in the event of the knocking, in a comparative manner.

FIG. 5 is a chart showing a change in in-cylinder pressure in the event of the preignition, and a change in in-cylinder pressure in the event of the knocking, in a comparative manner. In FIG. 5, the change in in-cylinder pressure in the event of the preignition is indicated by a waveform Pp, and the change in in-cylinder pressure in the event of the knocking is indicated by a waveform Pn. Further, in FIG. 5, in order to clearly express a difference between the waveforms Pp, Pn, the waveform Pp in the event of the preignition is illustrated as a change in in-cylinder pressure appearing when the pre-ignition fairly develops (into a serious level or a level close thereto)

As is clear from the waveform Pp, when the preignition fairly develops, the in-cylinder pressure is largely increased around the compression TDC, and the increased pressure is restored to a normal level within a relatively short period of time. On the other hand, in the event of the knocking, as indicated by the waveform Pn, a peak of the waveform where the in-cylinder pressure is rapidly increased occurs at a position largely offset on the retard side with respect to a peak of the waveform in the event of the preignition. Specifically, in the knocking which is a phenomenon that, after a combustion process progresses to some extent, a remaining unburned air-fuel mixture (end gas) self-ignites, a rapid increase in in-cylinder pressure to be caused by the self-ignition occurs at a last phase of the combustion process, and thereby the peak of the waveform is offset farther toward the retard side.

Figure 6:
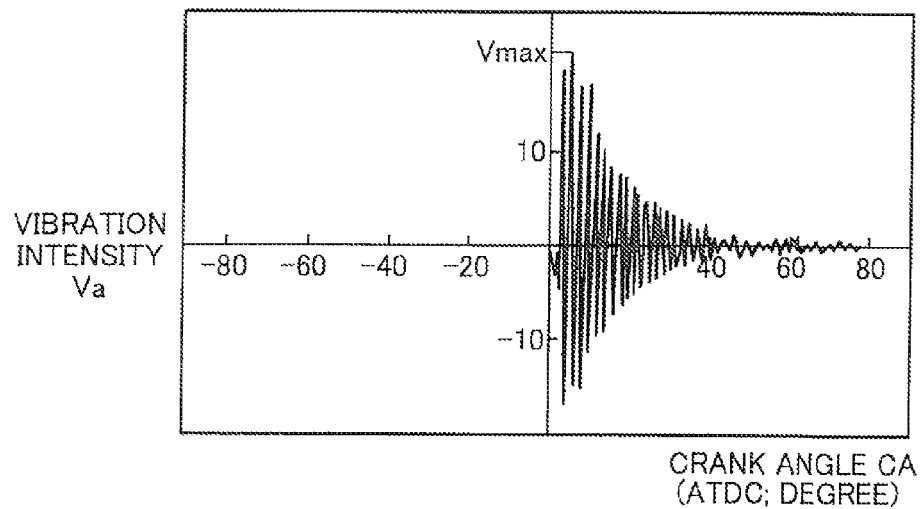
FIG. 6 is a chart showing one example of a waveform to be input from a vibration sensor in the event of the preignition.
Figure 7:
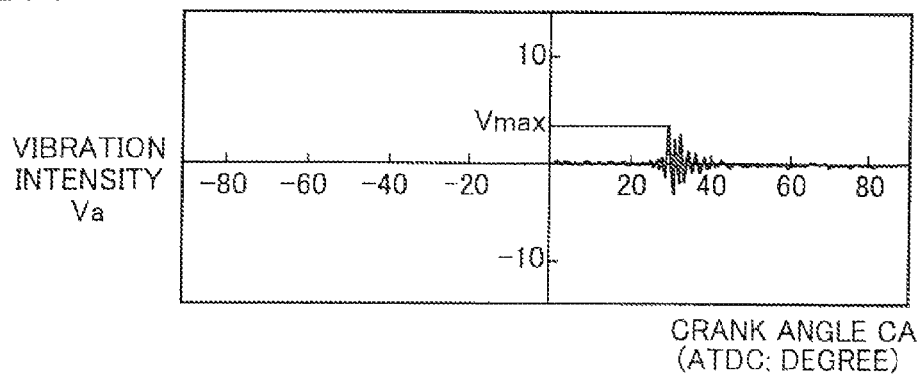
FIG. 7 is a chart showing one example of a waveform to be input from the vibration sensor in the event of the knocking.

FIGS. 6 and 7 show a vibration waveform to be input from the vibration sensor 33 when the change in in-cylinder pressure as shown in FIG. 5 occurs in the event of the preignition or the knocking. In FIGS. 6 and 7, the vertical axis and the horizontal axis represent a vibration intensity (vibration acceleration) Va input from the vibration sensor 33, and a crank angle CA, respectively, i.e., the vibration waveform shows a change in the vibration intensity Va depending on the crank angle CA.

Comparing between FIGS. 6 and 7, the vibration waveform in the event of the preignition (FIG. 6) is large in a maximum value Vmax of a detected vibration intensity Va (hereinafter referred to simply as "maximum vibration intensity Vmax"), and early in a detection timing of the maximum vibration intensity Vmax, as compared to the vibration waveform in the event of the knocking. This would be because, in the fairly developed preignition as shown in FIG. 5, a portion where the in-cylinder pressure most rapidly changes (i.e., a peak of the waveform) has a large amplitude, and occurs at a point fairly offset on the advance side, as compared the knocking.

As above, it is proven that a relatively clear feature can be found out in a magnitude (amplitude) and a detection timing of the maximum vibration intensity Vmax to be detected when the preignition fairly develops. However, in a situation where the preignition does not sufficiently develop (for example, in the mild preignition as indicated by the waveform J1 in FIG. 4), a magnitude and a detection timing of the maximum vibration intensity Vmax are not largely different from those in the event of the knocking. Thus, it is likely that the preignition cannot be detected due to difficulty in clearly distinguishing between the preignition and the knocking by simply analyzing the waveform of the vibration intensity Va.

Therefore, in this embodiment, in a situation where a maximum vibration intensity Vmax equal to or greater than a given threshold value is detected by the vibration sensor 33, and it is suspected that the preignition or the knocking occurs, in order to distinguish therebetween, a spark timing is intentionally retarded, and it is determined which of the preignition and the knocking occurs, based on a change in the maximum vibration intensity Vmax after the spark timing retard.

Specifically, in the specific operating region R, i.e., in a low engine speed/high engine load region, having a risk of the occurrence of the preignition, the spark timing in the normal state is set at the point which is slightly late with respect to the compression TDC (e.g., at about 5 degrees CA ATDC). Differently, when the maximum vibration intensity Vmax equal to or greater than the given threshold value is detected by the vibration sensor 33, the spark timing is retarded with respect to the point in the normal state by a given amount, so that the spark ignition will be performed at a later timing with respect to the compression TDC. Then, the abnormal combustion determination section 42 is operable to analyze in what manner the maximum vibration intensity Vmax is changed according to the spark timing retard so as to determine which of the preignition and the knocking occurs.

For example, in the event of the knocking, the spark timing is retard in the above manner, and thereby combustion is initiated on the retard side farther from the compression TDC (i.e., in a state after the in-cylinder temperature/pressure is lowered). Thus, in a subsequent combustion process, self-ignition of an unburned air-fuel mixture (end gas) becomes less likely to occur. Thus, based on retarding the spark timing in the event of the knocking, a level of the knocking contracts, and an occurrence timing of the knocking becomes later. As a result, a phenomenon is observed that a magnitude of the maximum vibration intensity Vmax detected by the vibration sensor 33 is lowered, and a detection timing of the maximum vibration intensity Vmax becomes later.

Figure 8:
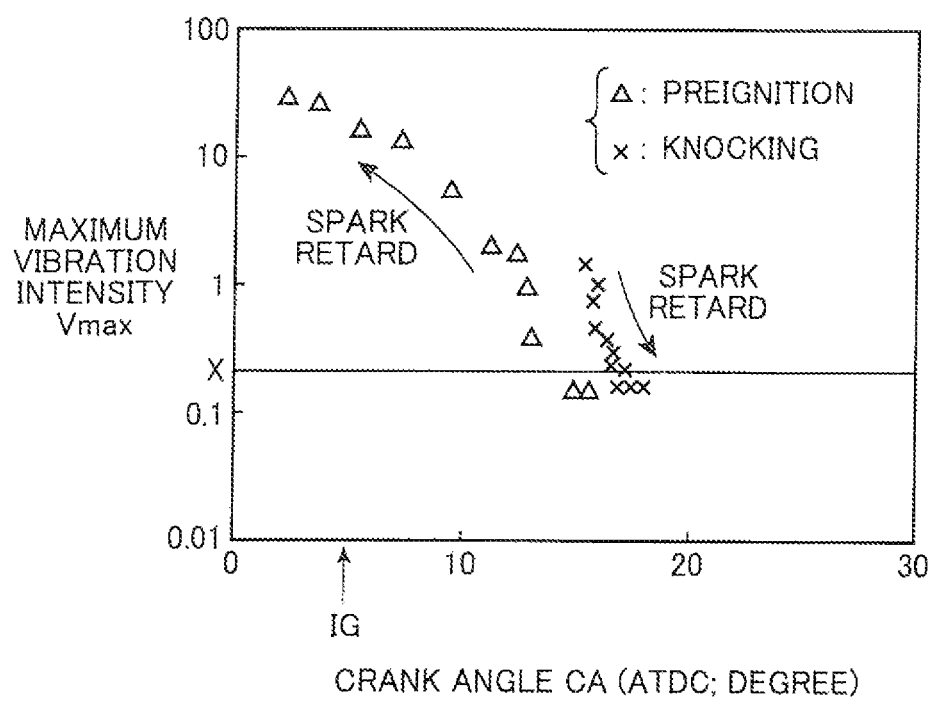
FIG. 8 is a chart showing in what manner a magnitude and a detection timing of a maximum vibration intensity are changed when a spark timing is retarded in the event of the preignition and in the event of the knocking.

In FIG. 8, the marks "x" indicate in what manner the maximum vibration intensity Vmax detected by the vibration sensor 33 is changed when the spark timing is gradually retarded in the event of the knocking. As see in FIG. 8, along with the spark timing retard, plots of the maximum vibration intensity Vmax (the marks "x") is gradually shifted toward a lower right side. This shows that, along with the spark timing retard, the magnitude of the maximum vibration intensity Vmax is gradually lowered, and a crank angle at the detection timing of the maximum vibration intensity Vmax is gradually offset toward the retard side. In FIG. 8, the value X on the vertical axis indicates a threshold value for determining whether the spark timing should be retarded, wherein, when a maximum vibration intensity Vmax equal to or greater than the threshold value X is detected, the spark timing retard is performed.

In the above manner, the knocking can be suppressed by retarding the spark timing. However, in the event of the pre-ignition where an air-fuel mixture self-ignites irrespective of the spark timing, even if the spark timing is retarded, the self-ignition still occurs, and thereby the preignition is not suppressed. Rather, as described based on FIG. 4, once the pre-ignition occurs, it will gradually develop with time, which leads to earlier combustion initiation timing and more rapid combustion. This is the reason why the marks "Δ" indicating the maximum vibration intensity Vmax in the event of the preignition is gradually shifted toward an upper left side in FIG. 8. In other words, in the event of the preignition, the magnitude of the maximum vibration intensity Vmax will gradually increase with time, irrespective of the spark timing retard, and the detection timing of the maximum vibration intensity Vmax is gradually advanced.

The above date shows that, in the event of the preignition, an increase in the magnitude and an increase in advance amount of the detection timing of the maximum vibration intensity Vmax are observed despite the spark timing retard, whereas, in the event of the knocking, a lowering in the magnitude and an increase in retard amount of the detection timing of the maximum vibration intensity Vmax are observed along with the spark timing retard. From this stand point, in this embodiment, it is determined which of the preignition and the knocking occurs, based on a change in (magnitude and detection timing of) the maximum vibration intensity Vmax along with the spark timing retard. This makes it possible to accurately distinguish between the preignition and the knocking, even using the vibration sensor 33.

(4) Control Operation

With reference to the flowcharts in FIGS. 9 to 12, a control operation based on the ECU 40 having the above functions will be described below. The following description will be made mainly about an operation of detecting the preignition and the knocking, and an avoidance operation to be executed when the preignition or the knocking are detected.

Figure 9:
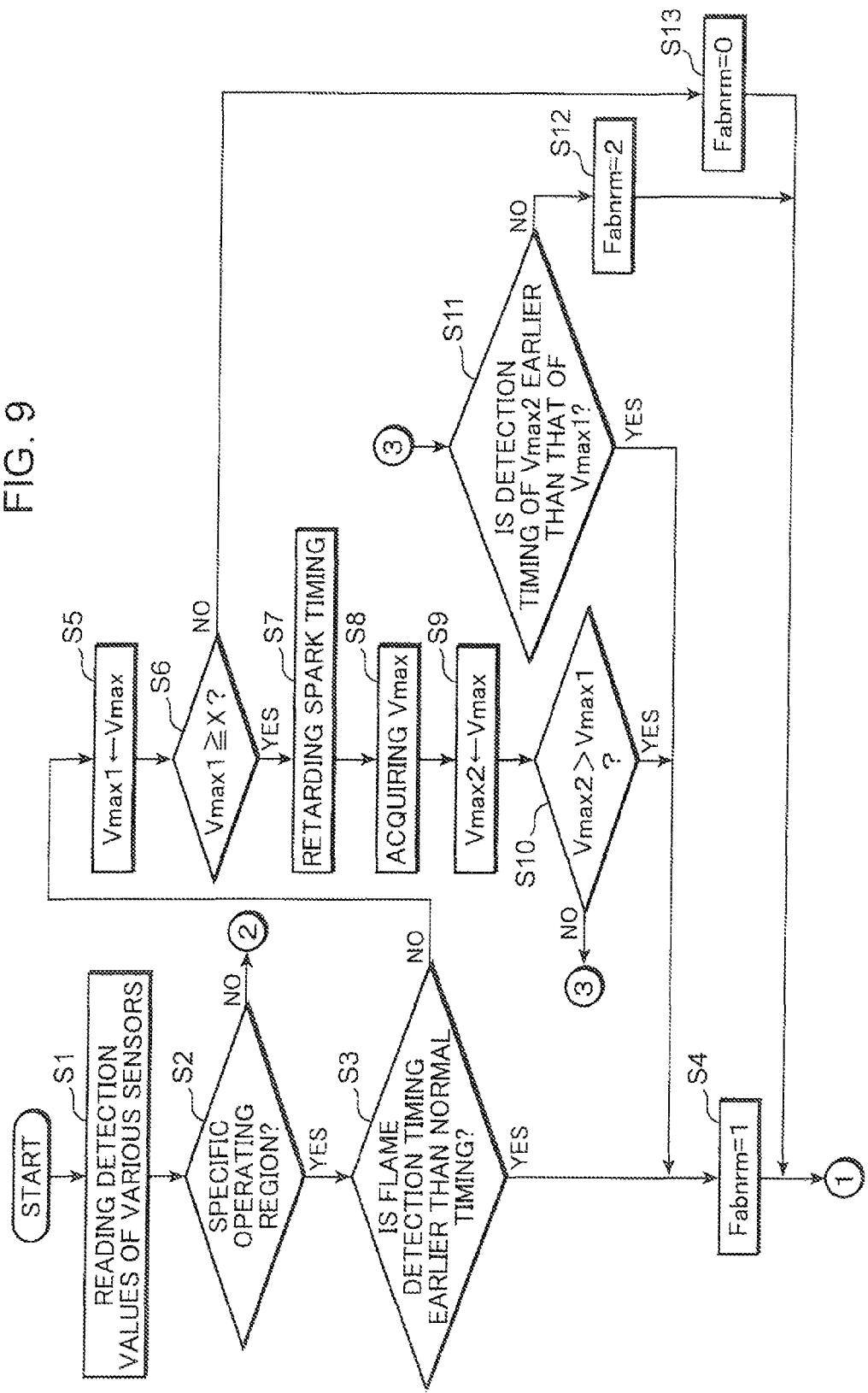
FIG. 9 is a flowchart showing details of a control operation for detecting the preignition and the knocking.

Upon start of a processing routine illustrated in the flow-chart in FIG. 9, the ECU 40 firstly executes a control operation of reading respective detection values of the sensors (Step S1). More specifically, respective values of the engine speed Ne, the intake air amount Qa, the accelerator-pedal angle AC, the vibration intensity Va and the ion current value Io are read from corresponding ones of the engine speed sensor 30, the airflow sensor 31, the accelerator-pedal angle sensor 32, the vibration sensor 33 and the ion current sensor 34, and input into the ECU 40.

Then, the ECU 40 executes, based on the information read in the Step S1, a control operation of determining whether the engine operating state is presently in the specific operating region R illustrated in FIG. 3 (Step S2). More specifically, it is determined whether both of the engine speed Ne read in the Step S1, and an engine load Ce calculated from the intake air amount Qa (or the accelerator-pedal angle AC) read in the Step S1, are included in the specific operating region R in FIG. 3.

When the determination in the Step S2 is NO, i.e., it is ascertained that the present engine operating state is out of the specific operating region R, a normal control mode is maintained (Step S32 in FIG. 10), because such an engine operating state has no risk of the occurrence of the preignition, and thereby there is no need to execute after-mentioned control operations in Step S3 and subsequent Steps (such as determination on abnormal combustion, and an abnormal combustion avoidance control). Specifically, parameters, such as the fuel injection amount, the fuel injection timing and the operating timing of the intake valve 11, are controlled according to respective normal target values preliminarily set depending on the engine operating state.

On the other hand, when the determination in the Step S2 is YES, i.e., it is ascertained that the engine operating state is presently in the specific operating region R, the ECU 40 executes, based on the ion current value Io read in the Step S1, a control operation of determining whether the flame formation timing is earlier than that in the normal combustion state, i.e., whether the preignition occurs (Step S3). More specifically, when the flame formation timing identified based on the ion current value Io is earlier than a pre-stored normal combustion initiation timing (a timing which is slightly later than the timing of the spark ignition (spark timing); e.g., the point t0 in FIG. 4) by a given time or more, it is determined that the preignition occurs.

When the determination in the Step S3 is YES, i.e., the occurrence of the preignition is ascertained, the ECU 40 executes a control operation of setting an abnormal combustion flag Fabnrm for recording a combustion state (a default value of the flag is "0"), to "1" which denotes that the preignition occurs (Step S4).

On the other hand, when the determination in the Step S3 is NO, i.e., no preignition is detected from the ion current value Io, the ECU 40 executes a control operation of acquiring a maximum value of the vibration intensity Va (maximum vibration intensity Vmax) based on the vibration intensity Va read from the vibration sensor 33 in the Step S1, and storing the acquired maximum vibration intensity Vmax as a maximum vibration intensity Vmax1 (Step S5). Then, the ECU 40 executes a control operation of determining whether the stored maximum vibration intensity Vmax1 is equal to or greater than the predetermined threshold value X (see FIG. 8) (Step S6).

When the determination in the Step S6 is YES, i.e., it is ascertained that the maximum vibration intensity Vmax1 is equal to or greater than the threshold value X, the ECU 40 executes a control operation of retarding the spark timing of the spark plug 16 by a given amount (Step S7). Specifically, the spark timing in the specific operating region R and in the normal state (normal spark timing) is set at the point which is slightly late with respect to the compression TDC (e.g., about 5 degrees CA ATDC), as mentioned above. Thus, based on the above spark timing retard, a retard amount between a compression TDC and the spark timing is further increased.

After completion of the spark timing retard, the ECU 40 executes a control operation of acquiring a maximum vibration intensity Vmax from the vibration intensity Va input from the vibration sensor 33 after the spark timing retard, and storing the acquired maximum vibration intensity Vmax as a maximum vibration intensity Vmax2 (Steps S8 and S9). Then, the ECU 40 executes a control operation of determining whether the stored maximum vibration intensity Vmax2 is greater than the maximum vibration intensity Vmax1 stored in the Step S5 (i.e., maximum vibration intensity stored before retarding the spark timing) (Step S10). In the following description, the maximum vibration intensity Vmax2 stored after retarding the spark timing will be referred to as "post-spark retard maximum vibration intensity Vmax2", and the maximum vibration intensity Vmax1 stored before retarding the spark timing will be referred to as "pre-spark retard maximum vibration intensity Vmax1". In this case, the "post-spark retard maximum vibration intensity Vmax2" corresponds to "post-spark retard maximum detection value" set forth in the appended claims, and the "pre-spark retard maximum vibration intensity Vmax1" corresponds to "pre-spark retard maximum detection value" set forth in the appended claims.

When the determination in the Step S10 is YES, i.e., it is ascertained that the post-spark retard maximum vibration intensity Vmax2 is greater than the pre-spark retard maximum vibration intensity Vmax1 (this means that the maximum vibration intensity Vmax is increased despite the spark timing retard), the ECU 40 executes a control operation of setting the abnormal combustion flag Fabnrm to "1" which denotes that the preignition occurs (the Step S4). Specifically, as indicated by the marks "Δ" in FIG. 8, in the event of the preignition, even if the spark timing is retarded, the preignition is not suppressed, and the maximum vibration intensity Vmax will be increased. Thus, when the relation:

Vmax2>Vmax1, is ascertained, it can be determined that the preignition occurs, and therefore the abnormal combustion flag Fabnrm is set to "1".

On the other hand, when the determination in the Step S10 is NO, i.e., it is ascertained that the post-spark retard maximum vibration intensity Vmax2 is equal to or less than the pre-spark retard maximum vibration intensity Vmax1, the ECU 40 executes a control operation of determining whether a detection timing of the post-spark retard maximum vibration intensity Vmax2 is earlier than a detection timing of the pre-spark retard maximum vibration intensity Vmax1 (Step S11).

When the determination in the Step S11 is YES, i.e., it is ascertained that the detection timing of the post-spark retard maximum vibration intensity Vmax2 is earlier than that of the pre-spark retard maximum vibration intensity Vmax1 (this means that a detection timing of the maximum vibration intensity Vmax becomes earlier despite the spark timing retard), the ECU 40 executes a control operation of setting the abnormal combustion flag Fabnrm to "1" which denotes that the preignition occurs (the Step S4). Specifically, as indicated by the marks "Δ" in FIG. 8, when the detection timing of the maximum vibration intensity Vmax is advanced irrespective of the spark timing retard, it can be determined that the preignition occurs, and therefore the abnormal combustion flag Fabnrm is set to "1".

As shown in the Steps S10 and S11, in this embodiment, after retarding the spark timing, it is firstly determined whether the magnitude of the maximum vibration intensity Vmax is increased (S10). Then, even if it is determined in the Step S10 that the magnitude of the maximum vibration intensity Vmax is not increased, it is determined whether the detection timing of the maximum vibration intensity Vmax becomes earlier (S11). When one of the determinations in the Steps S10 and S11 is YES, it is determined that the preignition occurs. Specifically, as indicated by the marks "Δ" in FIG. 8, in the event of the preignition, the following phenomena are generally observed: the magnitude of the maximum vibration intensity Vmax is increased; and the detection timing of the maximum vibration intensity Vmax is advanced. However, there is a possibility that only one of the phenomena is observed depending on environments. Therefore, the determination on the occurrence of the preignition is made when one of the determinations in the Steps S10 and S11 is YES.

The following description will be made about a control operation to be executed when the determination in the Step S11 is NO. In this case, the magnitude of the maximum vibration intensity Vmax is lowered, and the detection timing of the maximum vibration intensity Vmax becomes later. Thus, in Step S12, the ECU 40 executes a control operation of setting the abnormal combustion flag Fabnrm to "2" which denotes that the knocking occurs. Specifically, as indicated by the marks "x" in FIG. 8, when the spark timing is retarded in the event of the knocking, the magnitude of the maximum vibration intensity Vmax is lowered, and the detection timing of the maximum vibration intensity Vmax is retarded. Thus, when such phenomena are observed, it can be determined that the knocking occurs, and therefore the abnormal combustion flag Fabnrm is set to "2".

When the determination in the Step S6 is NO, i.e., it is ascertained that the pre-spark retard maximum vibration intensity Vmax1 is less than the threshold value X (this means that neither the preignition nor the knocking occurs), the ECU 40 executes a control operation of setting the abnormal combustion flag Fabnrm to "0" which denotes that a combustion state is normal (Step S13).

As above, in the flowchart illustrated in FIG. 9, when the engine operating state is in the specific operating region R, it is determined whether the preignition or the knocking occurs, based on respective detection values of the ion current sensor 34 and the vibration sensor 33, and then the abnormal combustion flag Fabnrm is set to one of the values "0", "1", "2", depending on a result of the determination.

Figure 10:
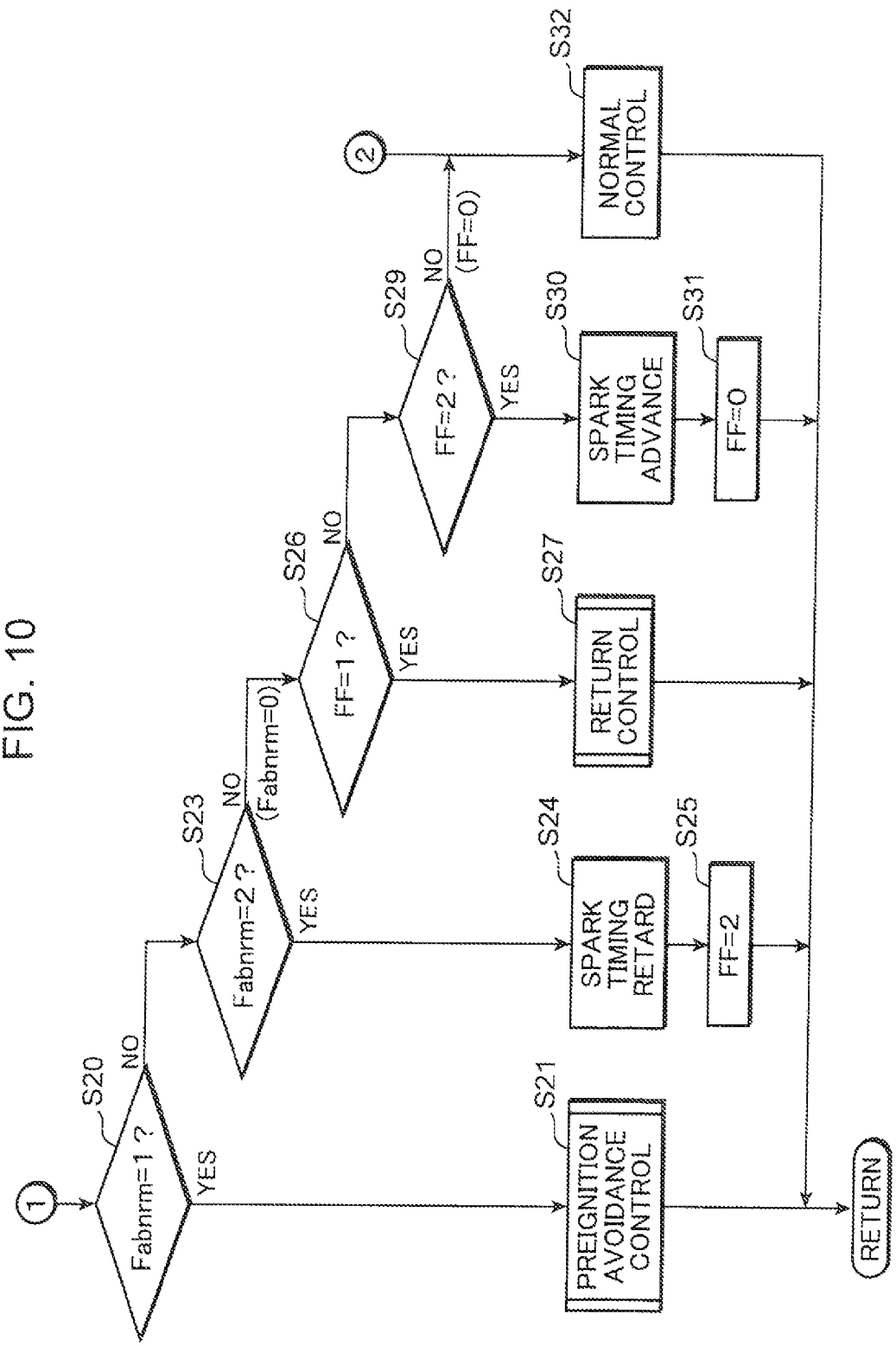
FIG. 10 is a flowchart showing details of a control operation to be executed in response to a detection result in FIG. 9.

FIG. 10 shows a processing routine continuing from the flowchart in FIG. 9. Upon start of the processing routine illustrated in FIG. 10, the ECU 40 executes a control operation of determining whether the abnormal combustion flag Fabnrm is 1 (Step S20). When the determination in the Step S20 is YES (Fabnrm=1), i.e., it is ascertained that the preignition occurs, the ECU 40 executes a preignition avoidance control as a special control mode for avoiding the preignition (Step S21).

Figure 11:
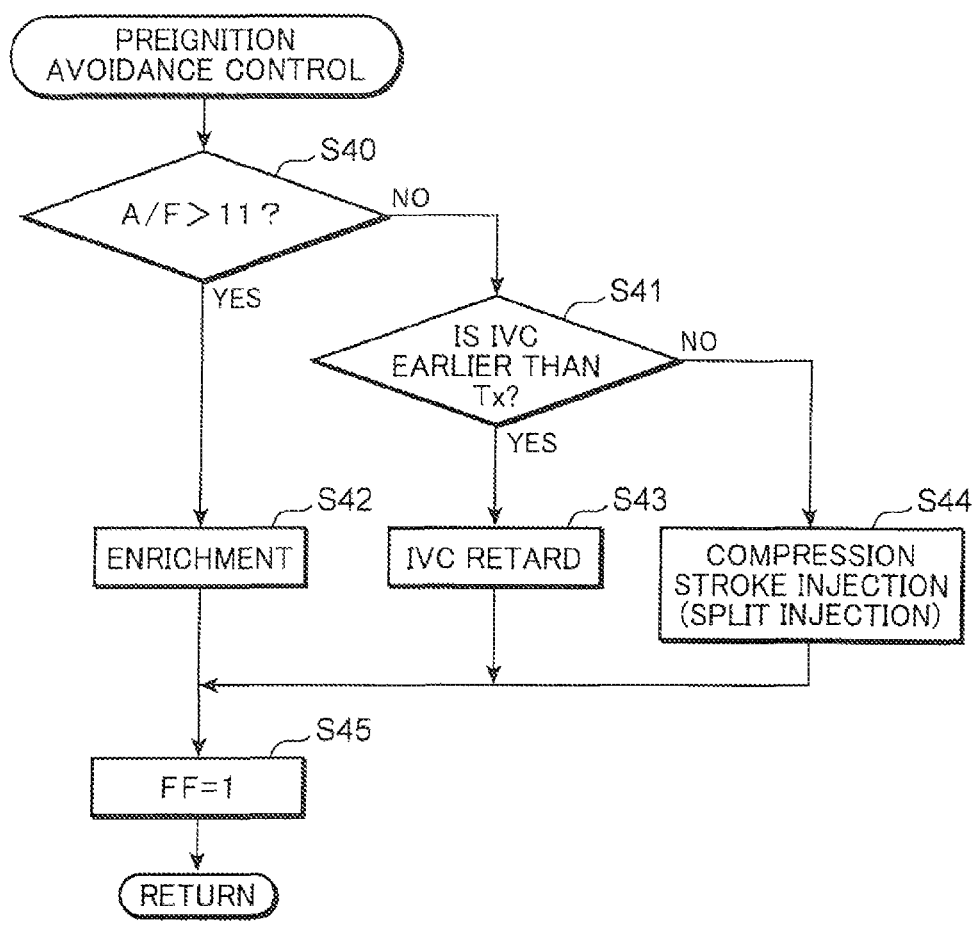
FIG. 11 is a flowchart showing details of a preignition avoidance control subroutine included in the flowchart illustrated in FIG. 10.
Figure 12:
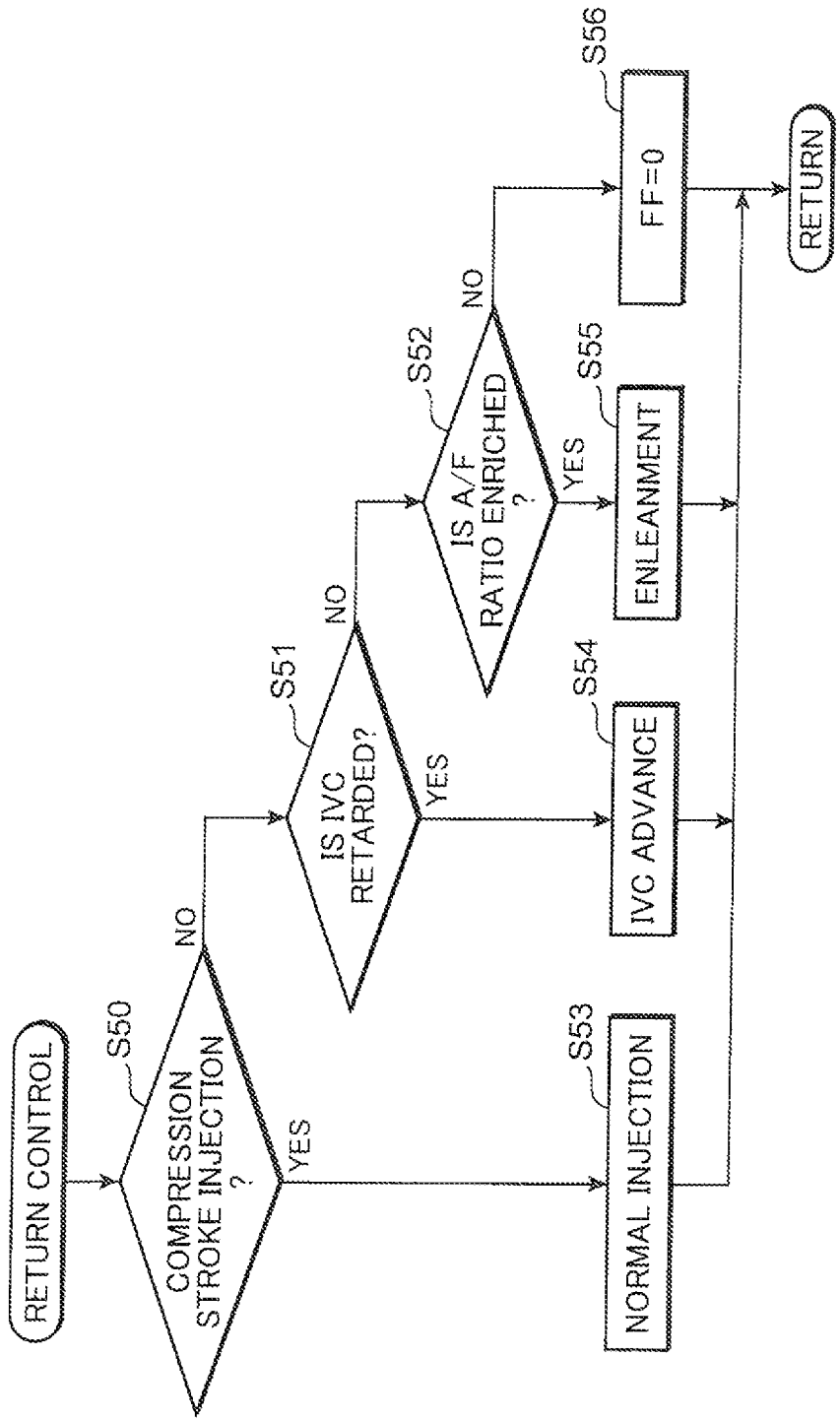
FIG. 12 is a flowchart showing details of a return control subroutine included in the flowchart illustrated in FIG. 10.

With reference to FIG. 11, details of the preignition avoidance control in the Step S21 will be described below. Upon start of the preignition avoidance control, the ECU 40 executes a control operation of determining whether a present setup value of the in-cylinder air-fuel (A/F) ratio is greater than 11 (Step S40). The threshold value (A/F ratio=11) for the determination in the Step S40 is an A/F limit value to be allowed during an after-mentioned control operation of enriching the A/F ratio in Step S42. If the A/F ratio is enriched to a value less than 11, such a rich A/F ratio is likely to cause smoke, and disadvantageous in terms of fuel economy. Thus, an A/F ratio as the A/F limit value for the enrichment is set to 11.

In the specific operating region R, the in-cylinder A/F ratio is initially set to a stoichiometric air/fuel ratio (=14.7) or a value slightly richer than the stoichiometric air/fuel ratio, i.e., a value leaner than the A/F limit value (=11). Consequently, the determination in the Step S40 is initially made as YES. Then, in the next Step S42, the ECU 40 executes a control operation of enriching the A/F ratio. More specifically, a fuel injection amount from the injector 18 is increased to enrich a present setup value of the in-cylinder A/F ratio by a given amount.

The enrichment of the A/F ratio is performed in a multistage (stepwise) manner. For example, when a present value of the A/F ratio is 14.7 (stoichiometric air/fuel ratio), it is firstly enriched to a smaller value of 12.5. When the preignition cannot be avoided even after the first enrichment, the A/F ratio is further enriched to a smallest vale of 11 (A/F limit value). Differently, in cases where the preignition is successfully avoided just after the first enrichment (14.7→12.5), the enrichment control operation is terminated at this timing.

In a situation where the preignition continuously occurs even after enriching the A/F ratio to 11 in the Step S42, the determination in the Step S40 is made as NO. Then, in Step S41, the ECU 40 executes a control operation of determining whether a present setup point of the intake valve closing (IVC) timing is earlier than a point Tx obtained by a control operation of maximally retarding the IVC timing in aftermentioned Step S43 (latest IVC timing Tx). The latest IVC timing Tx as a threshold value for the determination in the Step S41 is set to a point at which blowback of intake air starts occurring and the effective compression ratio of the engine is reduced to some extent with respect to the geometrical compression ratio of the engine (e.g., about 110 degrees CA after the intake BDC (ABDC)). If the IVC timing is retarded beyond the latest IVC timing Tx, an engine power output becomes insufficient due to significant reduction in effective compression ratio of the engine. Thus, the latest IVC timing Tx is set as an allowable maximum retard amount.

In the specific operating region R, the IVC timing is initially set to a point at which almost no blowback of intake air occurs, e.g., about 35±5 degrees CA after the intake BDC (ABDC) of the intake stroke. Consequently, the determination in the Step S41 is initially made as YES. Then, in Step S43, the ECU 40 executes a control operation of retarding the IVC timing. More specifically, the VVT mechanism 15 is driven to retard the operating timing of the intake valve 11, so that the IVC timing is retarded with respect to a present setup point thereof by a given amount to reduce the effective compression ratio of the engine.

The intake valve closing (IVC) timing retard is performed in a multi-stage (stepwise) manner, as with the control operation of enriching the A/F ratio in the Step S42. Specifically, the IVC timing is firstly retarded by a given amount. Then, when the preignition is successfully avoided by the first retard, any further retard is inhibited. On the other hand, when the preignition cannot be avoided even after the first retard, the retard amount is further increased.

In this embodiment, in the operation of retarding the IVC timing in a multi-stage manner as mentioned above, a retard amount in each stage is set to allow the effective compression ratio to be reduced at constant intervals along with the IVC timing retard. For this purpose, the retard amount in each stage is set to a larger value as the IVC timing before the intake valve timing retard is closer to the intake BDC, and gradually reduced along with progress in the IVC timing retard.

Figure 13:
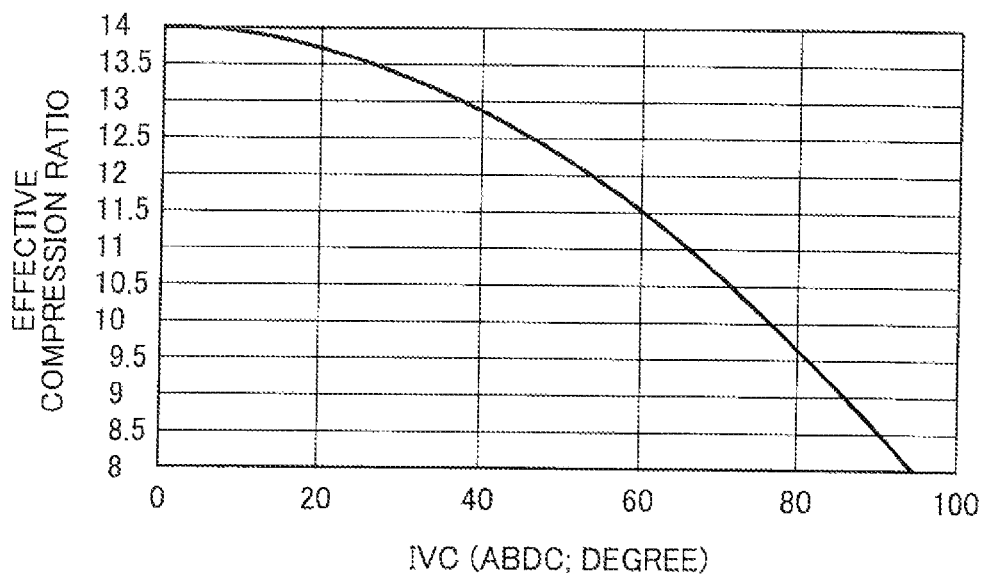
FIG. 13 is a graph showing a relationship between a retard amount of an intake valve closing timing and an effective compression ratio.

With reference to FIG. 13, the reason for controlling the retard amount in the above manner will be described. FIG. 13 is a graph showing a relationship between a retard amount of an IVC timing and an effective compression ratio of a spark-ignition engine having a geometrical compression ratio of 14. As seen in the graph illustrated in FIG. 13, as the IVC timing becomes farther away from an intake BDC (toward a right side of the horizontal axis), a gradient of the curve in the graph becomes steeper, and a reduction rate of the effective compression ratio is gradually increased. Thus, as a prerequisite to constantly reducing the effective compression ratio by a constant amount, it is necessary that, as a present point of the IVC timing is more largely retarded with respect to the intake BDC, a retard amount from the present IVC timing is set to a smaller value. On the other hand, it is necessary that, as the present IVC timing is closer to the intake BDC, the retard amount is set to a larger value.

Figure 14:
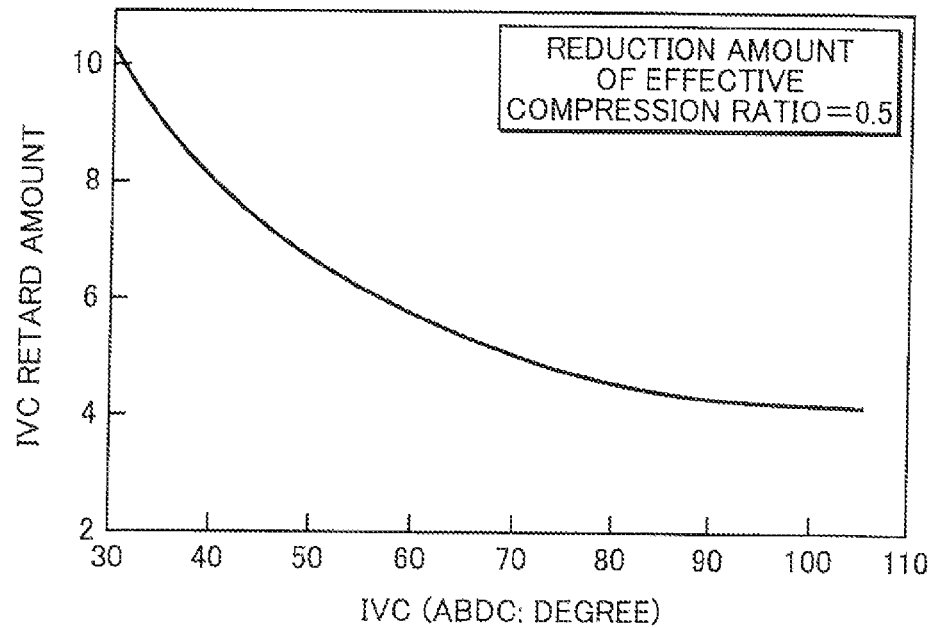
FIG. 14 is a graph showing in what manner an additional retard amount of the intake valve closing timing required for reducing the effective compression ratio by 0.5 is changed depending on a present retard amount of the intake valve closing timing from an intake BDC.

FIG. 14 is a graph showing in what manner an additional retard amount of the IVC timing required for reducing the effective compression ratio by 0.5 (vertical axis) is changed depending on a present retard amount of the IVC timing from the intake BDC (horizontal axis), wherein the IVC timing is shifted from 30 degrees CA ABDC toward the retard side. As see in the graph illustrated in FIG. 14, for example, when the present retard amount of the IVC timing is 30 degrees CA, the effective compression ratio can be reduced by 0.5 only if the IVC timing is additionally retarded by about 10 degrees CA. In contrast, when the present retard amount of the IVC timing is 40 degrees CA, the effective compression ratio can be reduced by 0.5, when the IVC timing is additionally retarded only by about 8 degrees CA. As above, an additional retard amount of the IVC timing required for reducing the effective compression ratio by a given amount becomes smaller as a present retard amount of the IVC timing from the intake BDC becomes larger.

Therefore, when the IVC timing is retarded with respect to the intake BDC in the Step S43, the IVC timing is retarded up to the latest IVC timing Tx in a multi-stage manner, while gradually reducing the additional retard amount, as the IVC timing before the IVC timing retard becomes farther away from the intake BDC, so as to reduce the effective compression ratio in a multi-stage manner at constant intervals.

Figure 15A:
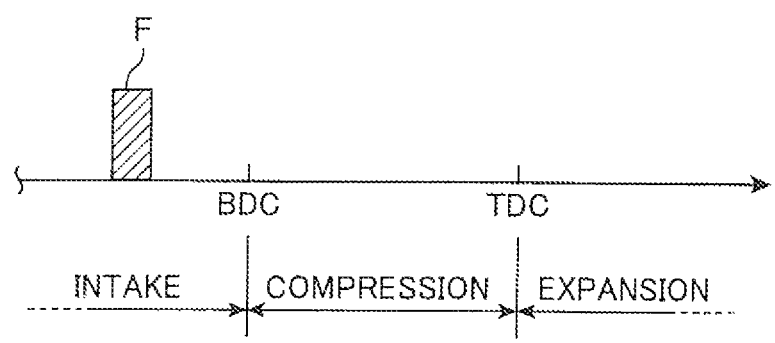
FIGS. 15A and 15B are explanatory diagrams showing a fuel injection timing, wherein FIG. 15A illustrated a fuel injection timing in the normal state.
Figure 15B:
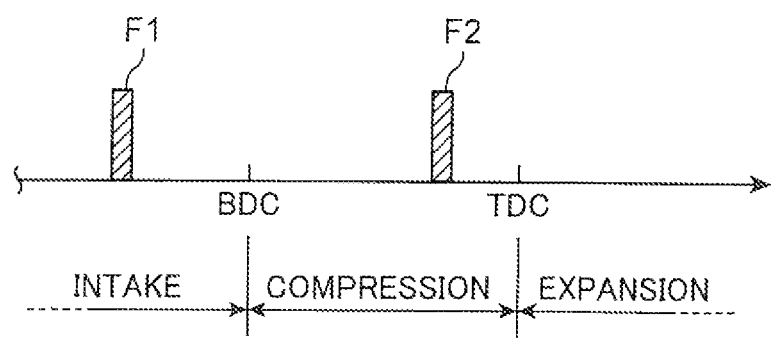

In a situation where the preignition continuously occurs even after retarding the IVC timing to the latest IVC timing Tx in the Step S43, the determination in the Step S41 is made as NO. Then, in Step S44, the ECU 40 executes a control operation of injecting a part of injection fuel in the compression stroke in a split manner. Specifically, as shown in FIG. 15A, the entire injection fuel is normally injected in the intake stroke (F in FIG. 15A). In the Step S44, as shown in FIG. 15B, an injection timing of a part of injection fuel is retarded to a later phase of the compression stroke to allow the injection fuel to be injected in the intake and compression strokes in a split manner (F1 and F2 in FIG. 15B).

As above, in the preignition avoidance control, the A/F ratio enrichment (the Step S42), the IVC timing retard (the Step S43) and the fuel injection timing retard (the Step S44) are executed in this priority order.

Upon start of one of the control operations in the Steps S42, S43 and S44, a control execution flag FF for recording a control execution state (a default value of the flag is "0") is subsequently set to "1" which denotes that the preignition avoidance control is being executed (Step S45), and the control is returned to the main routine illustrated in FIG. 10.

Figure 16:
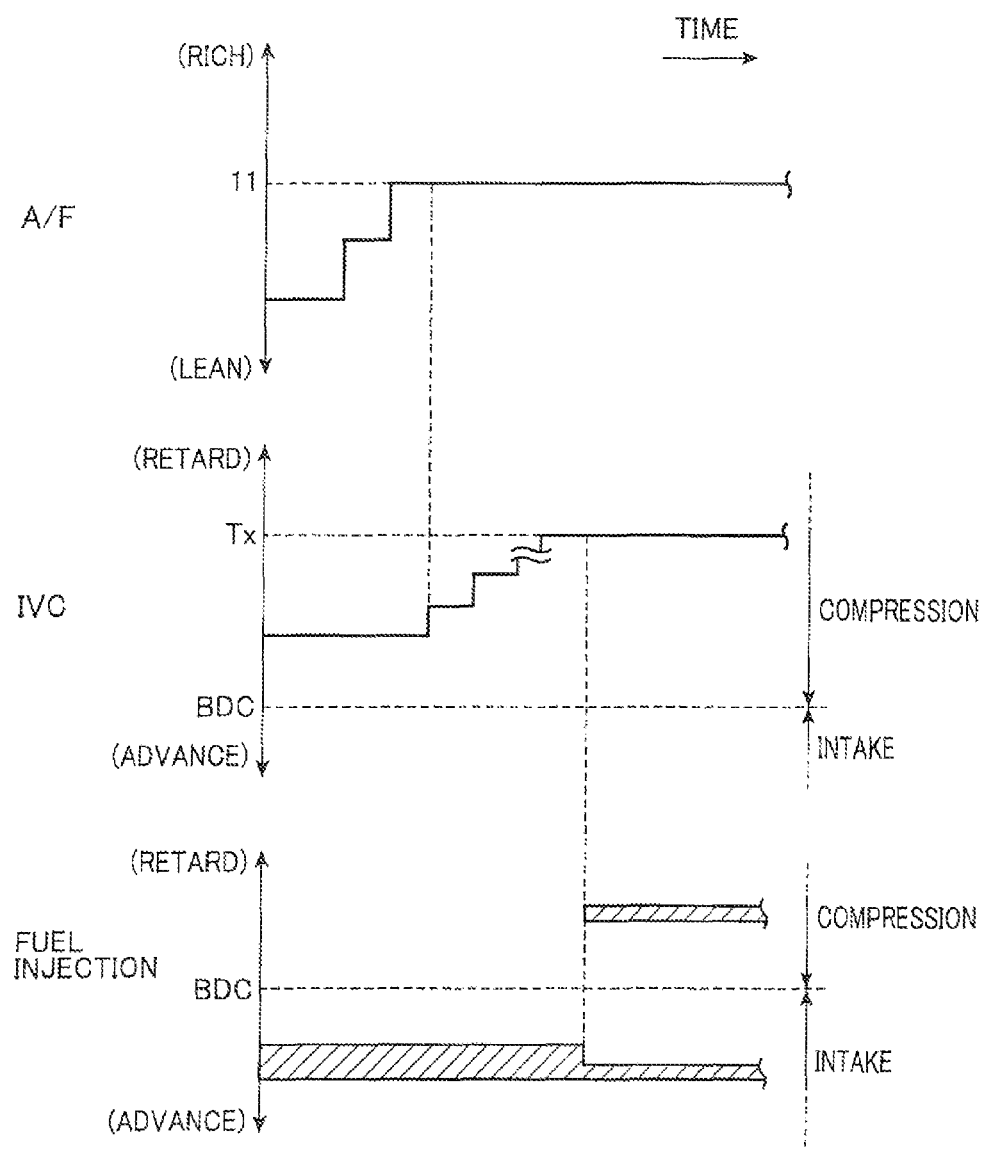
FIG. 16 is a time chart showing one example of an operation for the preignition avoidance control, in a time-series manner.

FIG. 16 is a time chart showing in what manner each of the A/F ratio, the IVC timing and the fuel injection timing is changed with time, on an assumption that the preignition can be avoided only after executing all of the control operations in the Steps S42, S43 and S44. As can also be understood from FIG. 16, in the preignition avoidance control, the control operation of enriching the A/F ratio in a multi-stage manner is firstly executed by priority. Then, when the preignition cannot be avoided even after maximally enriching the A/F ratio (to 11), the IVC timing is secondly retarded in a multi-stage manner. Then, when the preignition still cannot be avoided even after maximally retarding the IVC timing, the fuel injection timing retard (injecting a part of injection fuel in the compression stroke) is lastly executed.

With reference to FIG. 10 again, a control operation to be executed when the determination in the Step S20 is NO, will be described below. In a situation where the preignition is sufficiently suppressed as a result of the preignition avoidance control (S21), or no preignition originally occurs, the abnormal combustion flag Fabnrm is a value other than 1, and thereby the determination in the Step S20 is made as NO. Then, in Step S23, the ECU 40 executes a control operation of determining whether the abnormal combustion flag Fabnrm is 2, i.e., whether the knocking occurs.

When the determination in the Step S23 is YES, i.e., it is ascertained that the knocking occurs, the ECU 40 executes a control operation of retarding the spark timing until the knocking is sufficiently suppressed (Step S24), while setting the control execution flag FF to "2" which denotes that the spark timing retard is being executed (Step S25).

In a situation where the knocking is sufficiently suppressed by the spark timing retard, or no knocking originally occurs, the determination in the Step S23 is made as NO. In other words, each of the determinations in the Steps S20 and S23 is NO, and thereby the abnormal combustion flag Fabnrm is 0 which denotes that neither the preignition nor the knocking occurs, i.e., the combustion state is normal. Then, in Step S26, the ECU 40 executes a control operation of determining whether the control execution flag FF is "1", i.e., whether the preignition avoidance control (S21) is being executed.

Assuming that the combustion state becomes normal as a result of the preignition avoidance control, the control execution flag FF is 1, and therefore the determination in the Step S26 is made as YES. Then, in Step S27, the ECU 40 executes a return control for releasing the preignition avoidance control to return the special control mode to the normal control mode.

Upon start of the return control, the ECU 40 executes a control operation of determining whether the control operation of retarding an injection timing of a part of injection fuel to the later phase of the combustion stroke (the Step S44 in FIG. 11) is being executed (Step S50). When the determination in the Step S50 is YES, i.e., it is ascertained that the fuel injection timing retard (compression stroke injection) is being executed, the ECU 40 executes a control operation of returning the injection timing of the part of injection fuel to a timing in the intake stroke which is a normal injection timing (Step S53).

In a situation where no preignition occurs after the fuel injection timing is returned to a normal timing (in the intake stroke), or the fuel injection timing retard is originally not executed, the determination in the Step S50 is made as NO. Then, in Step S51, the ECU 40 executes a control operation of determining whether the IVC timing is set on the retard side with respect to its original setup point.

In a situation where the IVC timing is retarded in the Step S43 illustrated in FIG. 11, the determination in the Step S51 is made as YES. Then, in Step S54, the ECU 40 executes a control operation of returning the IVC timing toward an advance side to increase the effective compression ratio.

The advancing of the IVC timing is performed in a multi-stage (stepwise) manner, as with the control operation in the Step S43 illustrated in FIG. 11. An advance amount in each stage is set to a smaller value as the IVC timing before the advancing becomes farther away from the intake BDC, and set to a larger value as the IVC timing before the advancing becomes closer to the intake BDC. Then, the multi-stage advancing is continued until the IVC timing reaches a normal point (a timing at which almost no blowback of intake air occurs; about 35±5 degrees CA ABDC), so as to gradually increase the effective compression ratio at constant intervals to a value close to the geometrical compression ratio.

In a situation where no preignition occurs after returning the IVC timing to the normal timing, or the IVC timing is not originally retarded, the determination in the Step S51 is made as NO. Then, in Step S52, the ECU 40 executes a control operation of determining whether the in-cylinder A/F ratio is enriched to a value richer than a normal value (which is equal to or close to the stoichiometric air/fuel ratio). When the determination in the Step S52 is YES, i.e., it is ascertained that the A/F ratio is enriched, the ECU 40 executes a control operation of returning the A/F ratio toward a lean side (the normal value) (Step S55).

The enleaning of the A/F ratio is performed in a multi-stage (stepwise) manner, as with the control operation in the Step S42 illustrated in FIG. 11. For example, the in-cylinder A/F ratio is enleaned and returned to the normal value in the following two stages: 11→12.5→14.7.

When the A/F ratio is returned to the normal value after completing the control operation in the Step S55, the determination in the Step S52 is made as NO. Then, the control execution flag FF is set to "0" (Step S56), and the control is returned to the main routine in FIG. 10.

Figure 17:
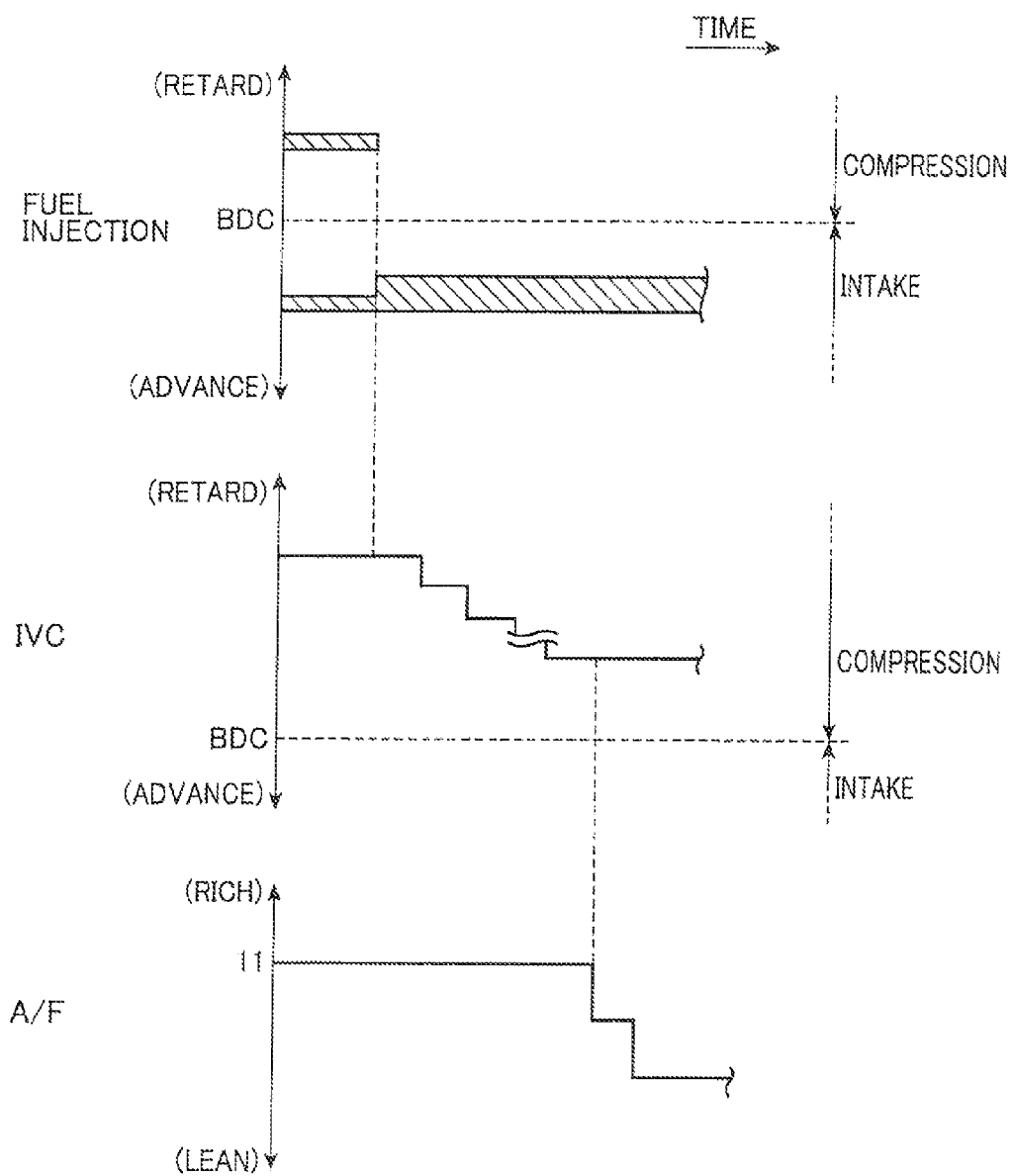
FIG. 17 is a time chart showing one example of an operation for the return control in a time-series manner.

FIG. 17 is a time chart showing temporal changes in the fuel injection timing, the A/F ratio and the IVC timing during the return control. Specifically, FIG. 17 shows in what manner each value of the fuel injection timing, the A/F ratio and the IVC timing is changed by the return control which is performed after the preignition avoidance control illustrated in FIG. 16, i.e., when all of the A/F ratio enrichment, the IVC timing retard and the fuel injection timing retard (injecting a part of injection fuel in the compression stroke) are required to avoid the preignition.

As shown in FIG. 17, in the return from the preignition avoidance control, the fuel injection timing retard is firstly released to return the fuel injection timing to the normal timing (in the intake stroke). Then, when no preignition occurs after the fuel injection timing return, the control operation of advancing the IVC timing to the normal timing is executed in a multi-stage manner. Then, when no preignition occurs after the IVC timing advance, the control operation of enleaning the A/F ratio to the normal value is executed in a multi-stage manner.

With reference to FIG. 10 again, a control operation to be executed when the determination in Step S26 is NO, will be described below. In a situation where, as a result of the return control, the preignition avoidance control (S21) is completely released and each of the A/F ratio, the IVC timing and the fuel injection timing is returned to the normal timing or value, or the preignition avoidance control is not originally performed, the control execution flag FF is a value other than 1, and therefore the determination in the Step S26 is made as NO. Then, in Step S29, the ECU 40 executes a control operation of determining whether the control execution flag FF is 2, i.e., whether the control operation of retarding the spark timing to avoid the knocking is executed.

When the determination in the Step S29 is YES, i.e., it is ascertained that the spark timing is retarded, the ECU 40 executes a control operation of advancing the retarded spark ignition to the spark timing in the normal state (e.g., in the specific operating region, about 5 degrees CA ATDC) (Step S30), and setting the control execution flag FF to "0" (Step S31).

In a situation where no knocking occurs after returning the spark timing to the point in the normal state in the above manner, or the spark timing retard is not originally performed, the determination in Step S29 is made as NO, and the normal control mode is maintained (Step S32).

(5) Functions/Effects

In the spark-ignition engine according to the above embodiment, in the specific operating region R set in a low engine speed/high engine load region, an operation for detecting a flame is performed using the ion current sensor 34, and the presence or absence of the preignition is determined based on a detection timing of the flame (flame formation timing). Further, even if no preignition is ascertained by the detection operation using the ion current sensor 34, an operation for detecting the preignition is performed using the vibration sensor 33. This technique has an advantage of being able to detect the preignition which is a phenomenon that an air-fuel mixture prematurely self-ignites, with a high degree of accuracy while distinguishing it from the knocking.

Specifically, in the operation for detecting the preignition using the vibration sensor 33, it is determined whether a maximum vibration intensity Vmax1 acquired from the vibration sensor 33 is equal to or greater than the threshold value X (S6). Then, when the maximum vibration intensity Vmax1 is equal to or greater than the threshold value X, the spark timing of the spark plug 16 is shifted from a point set in the normal state slightly on the retard side with respect to the compression TDC (e.g., about 5 degrees CA ATDC), farther toward the retard side. Further, it is determined whether a maximum vibration intensity acquired after the spark timing retard (post-spark retard maximum vibration intensity)

Vmax2 is greater than the maximum vibration intensity before the spark timing retard (pre-spark retard maximum vibration intensity) Vmax1 (S10). Then, when the Vmax2 is greater than the Vmax1, it is determined that the preignition occurs. The above process provides an advantage of being able to reliably detect the preignition while distinguishing it from the knocking, even if the preignition is in a relatively early stage, and has not so seriously developed (e.g., a mild preignition, such the waveform J1 in FIG. 4, or a similar preignition thereto).

For example, even if a maximum vibration intensity Vmax is simply compared with a reference value, it is difficult to determine which of the preignition and the knocking occurs, particularly, when the preignition is in a relatively early stage. As measures against this problem, in the above embodiment, in response to detection of a maximum vibration intensity Vmax equal to or greater than a given threshold value, the spark timing is intentionally retarded. Then, when an increase in magnitude of the maximum vibration intensity Vmax is ascertained between before and after the spark timing retard, it is determined that the preignition occurs. Specifically, the spark timing retard is effective only in suppressing the knocking (ineffective in suppressing the preignition). Based on this characteristic, the preignition and the knocking can be accurately distinguished from each other by analyzing a change in magnitude of a maximum vibration intensity Vmax after the spark timing retard.

Thus, in the above technique, it becomes possible to reliably detect the preignition which is a phenomenon that an air-fuel mixture prematurely self-ignites, while distinguishing it from the knocking, and eliminate a risk of missing the occurrence of the preignition even if a failure such as disconnection occurs in the ion current sensor 34 or the ion current sensor 34 has poor detection accuracy. Further, when the preignition is detected, measures for avoiding the preignition (i.e., the air/fuel ratio enrichment, the effective compression ratio reduction, etc.) can be taken to reliably prevent engine troubles (e.g., damage of a piston 5) due to continuation of the preignition.

Further, in the above embodiment, when a detection timing of a post-spark retard maximum vibration intensity Vmax2 is earlier than that of a pre-spark retard maximum vibration intensity Vmax1, it is determined that the preignition occurs, even if a magnitude of the Vmax2 is equal to or less than the Vmax1. Specifically, once the preignition occurs, the following phenomena are generally observed irrespective of the spark ignition timing: a magnitude of the maximum vibration intensity Vmax is increased; and a detection timing of the maximum vibration intensity Vmax is advanced. However, there is a possibility that only one of the phenomena is observed depending on environments. Therefore, the determination on the occurrence of the preignition is made when one of an increase in magnitude of the maximum vibration intensity Vmax and an advance in detection timing of the maximum vibration intensity Vmax is ascertained. This makes it possible to further enhance the detection accuracy of the preignition.

In the above embodiment, when the occurrence of the preignition is ascertained in the specific operating region R, based on respective direction values of the ion current sensor 34 and the vibration sensor 33 (when the determination in one of the Steps S3, S10 and S11 is YES), the preignition avoidance control (S21) is executed as a special control mode for avoiding the preignition. In the preignition avoidance control, the control operation of increasing a fuel injection amount from the injector 18 is firstly executed to enrich the in-cylinder air/fuel ratio (S42). Then, when the preignition is still detected even after the first control operation, the control operation of retarding an intake valve closing (IVC) timing is secondly executed to reduce the effective compression ratio of the engine (S43). Then, when the preignition is still detected even after the second control operation, the control operation of retarding an injection timing of a part of injection fuel to the later phase of the compression stroke (S44) is finally executed. This feature has an advantage of being able to effectively suppress the occurrence of the preignition, while maximally maintaining desired emission performance.

Specifically, in the above embodiment, in the preignition avoidance control for avoiding the preignition, the control operation of enriching the air/fuel ratio is firstly performed, and the control operation of retarding the fuel injection timing (injecting a part of injection fuel in the compression stroke) is lastly performed, so that it becomes possible to effectively suppress the occurrence of the preignition, while maximally avoiding deterioration in emission performance due to the occurrence of smoke.

In a spark-ignition engine, the preignition can be suppressed by enriching the air/fuel ratio or retarding the fuel injection timing to lower an in-cylinder temperature. However, the fuel injection timing retard (compression stroke injection) is likely to cause the occurrence of smoke. Thus, if the fuel injection timing retard is firstly performed, smoke is liable to frequently occur. In the above embodiment, in the event of the preignition, the air/fuel ratio is firstly enriched to lower the in-cylinder temperature, and then the fuel injection timing retard is executed only if the preignition cannot be avoided even after the air/fuel ratio enrichment. This provides an advantage of being able to maximally avoid the occurrence of smoke to maximally maintain desired emission performance.

In addition, the control operation of retarding the IVC timing is executed to reduce the effective compression ratio (S43), as a control operation having a priority lower than that of the air/fuel ratio enrichment (S42) and higher than that of the fuel injection timing retard (S44). This provides an advantage of being able to reduce a frequency of execution of the fuel injection timing retard so as to effectively prevent deterioration in emission performance due to the occurrence of smoke.

Specifically, after the air/fuel ratio enrichment, the control operation for reducing the effective compression ratio of the engine is performed to facilitate lowering in in-cylinder pressure, and then the fuel injection timing is retarded only if the preignition cannot be avoided even after the effective compression ratio reduction, so that it becomes possible to avoid the preignition without retarding the fuel injection timing, in a high possibility. This makes it possible to suppress the preignition while significantly reducing a frequency of execution of the fuel injection timing retard to maximally avoiding the occurrence of smoke.

In the above embodiment, when the normal control mode is shifted to the preignition avoidance control, the control operation of enriching the air/fuel ratio is firstly executed, and then, when the preignition cannot be avoided even after the air/fuel ratio enrichment, the control operation of retarding the IVC timing to reduce the effective compression ratio is executed. The two control operations (the air/fuel ratio enrichment and the effective compression ratio reduction) has no impact on emission performance (occurrence of smoke). Thus, in view of only this point, it is considered that the effective compression ratio reduction may be performed in advance of the air/fuel ratio enrichment. However, the control operation for reducing the effective compression ratio involves not only a problem of causing lowering in engine power output, but also a problem of poor control response. Specifically, particularly, when the VVT mechanism 15 is comprised of a hydraulic type, a relatively long response lag occurs in an operation of changing an operating timing of the intake valve 11. Thus, it can be said that the control operation of retarding the IVC timing to reduce the effective compression ratio is inferior to the control operation of increasing the fuel injection amount from the injector 18 to enrich the air/fuel ratio, in terms of control response.

Therefore, in the above embodiment, during the preignition avoidance control, the air/fuel ratio enrichment is executed in advance of the effective compression ratio reduction. This provided an advantage of being able to maximally avoid lowering in engine power output, based on giving a lower priority to the effective compression ratio reduction, and rapidly suppress the preignition just after the occurrence thereof, based on giving a higher priority to the air/fuel ratio enrichment which is excellent in control response.

In the above embodiment, during the preignition avoidance control the air/fuel ratio enrichment is performed in a multi-stage manner, and then, when the preignition is detected even after maximally enriching the air/fuel ratio (to an A/F limit value of 11), the control operation of reducing the effective compression ratio is executed (see FIG. 16). As above, the air/fuel ratio enrichment is performed in a multi-stage manner. Thus, for example, in cases where the severity of the preignition is mild, and the preignition can be avoided only by slightly enriching the air/fuel ratio, it becomes possible to prevent the air/fuel ratio from being excessively enriched so as to minimize deterioration in fuel economy, etc., due to the air/fuel ratio enrichment. On the other hand, in cases where the preignition cannot be avoided even after maximally enriching the air/fuel ratio, the preignition can be suppressed based on the effective compression ratio reduction or a combination of the effective compression ratio reduction and the fuel injection timing retard, so that it becomes possible to reliably avoid the preignition while preventing the air/fuel ratio from being excessively enriched, even if the preignition relatively develops.

In the above embodiment, as for the preignition avoidance control, the control operation of retarding the IVC timing is performed in a multi-stage manner to reduce the effective compression ratio, and then, when the preignition is detected even after maximally reducing the effective compression ratio (to an effective compression ratio corresponding to the latest IVC timing Tx), the control operation of retarding the fuel injection timing is executed. This feature has an advantage of being able to more reliably avoid the preignition while preventing an engine power output from being significantly lowered due to excessive reduction in effective compression ratio.

Particularly, in the above embodiment, during the operation of retarding the IVC timing in a multi-stage manner, an additional retard amount from the IVC timing is set to a larger value as a present point of the IVC timing is closer to the intake BDC, as shown in FIG. 14, so that it becomes possible to reduce the effective compression ratio at constant intervals in each stage for retarding the IVC timing. This provides an advantage of being able to more effectively suppress the occurrence of the preignition, while adequately avoiding a situation where the engine power putout is rapidly lowered in one stage for retarding the IVC timing, or the effective compression can be only slightly reduced and thereby almost no effect on suppression of the preignition is obtained.

In the above embodiment, the IVC timing in the normal state (where no preignition occurs) is set to the point on the retard side with respect to the intake BDC and at which almost no blowback of intake air occurs (in the specific operating region R, about 35±5 degrees CA ABDC). Then, when the effective compression ratio is reduced during the preignition avoidance control, the VVT mechanism 15 is driven to further retard the IVC timing with respect to the intake BDC. This provides an advantage of being able to efficiently reduce the effective compression ratio according to need, while sufficiently ensuring an engine power output in the normal state.

For example, considering only a function of reducing the effective compression ratio, the effective compression ratio may also be reduced by advancing the IVC timing to the advance side with respect to the intake BDC. However, in the engine where the IVC timing in the normal state is set on the retard side with respect to the intake BDC, as a prerequisite to shifting the IVC timing to the advance side with respect to the intake BDC so as to reduce the effective compression ratio, the operating timing of the intake valve 11 has to be largely changed, which causes a problem of deterioration in control response due to an increase in control amount of the VVT mechanism 15. In order to avoid this problem, it is contemplated to set a normal point of the IVC timing to be approximately equal to the intake BDC or on the advance side with respect to the intake BDC. However, in this case, it is impossible to sufficiently utilize induction inertial, which leads to lowering in engine power output.

In view of this, it is advantageous that a point of the IVC timing in the normal state is set on the retard side with respect to an intake BDC, and, when it is necessary to reduce the effective compression ratio, the IVC timing is retarded with respect to the point in the normal state, as in the above embodiment, in terms of a capability of efficiently reducing the effective compression ratio according to need, while sufficiently ensuring an engine power output in the normal state.

In the above embodiment, when the preignition avoidance control is returned to the normal control mode, the control operation of releasing the fuel injection timing retard (injecting a part of injection fuel in the compression stroke) is firstly executed to return, to a timing in the intake stroke, a fuel injection timing which has been retarded to the later phase of the compression stroke for the part of injection fuel. This has an advantage of being able to restore emission performance after the completion of the preignition avoidance control as early as possible.

For example, in cases where all of the air/fuel ratio enrichment, the effective compression ratio reduction (IVC timing retard) and the fuel injection timing retard, are required to avoid the preignition in the preignition avoidance control, when the preignition avoidance control, i.e., the special control mode, is returned to the normal control mode, the fuel injection timing retard is firstly released to return the fuel injection timing to a timing in the intake stroke, and then, when no preignition is detected after the fuel injection timing return, the IVC timing is secondly returned to an advance side to increase the effective compression ratio, whereafter, when no preignition is detected after the effective compression ratio increase, the air/fuel ratio is finally returned to a lean side, as shown in FIG. 17. In this feature, when the preignition is successfully avoided, the fuel injection timing retard is firstly released to eliminate a risk of the occurrence of smoke. This makes it possible to minimize a time period where emission performance deteriorates.

Then, when no preignition is detected after releasing the fuel injection timing retard, as a second priority control operation, the IVC timing is advanced to increase the effective compression ratio. This makes it possible to promptly eliminate a risk of drop of an engine power output due to a reduction of the effective compression ratio. Then, when no preignition is detected after the second control operation, the air/fuel ratio is finally returned to a lean side. This makes it possible to adequately return the special engine operating mode to the normal engine operating mode while guaranteeing the absence of the occurrence of the preignition.

(6) Modifications/Changes

In the above embodiment, during the preignition avoidance control, the air/fuel ratio is enriched in a multi-stage manner, for example, in the following two stages: 14.7→12.5→11. However, the number of stages is not limited to three, but the air/fuel ratio may be enriched in three stages or more. Alternatively, the number of enrichment stages may be set to only one. In this case, when the preignition cannot be avoided even after the air/fuel ratio enrichment, the control operation of retarding the IVC timing to reduce the effective compression ratio may be executed just after the air/fuel ratio enrichment.

In the above embodiment, when the IVC timing is retarded to reduce the effective compression ratio during the preignition avoidance control, the IVC timing is retarded in a multi-stage manner. In this case, the number of stages for the IVC timing retard may be appropriately set depending on engine characteristics.

Further, when it is desired to minimize lowering in engine power output in view of engine characteristics, the number of stages for the IVC timing retard may be set to only one. In this case, an additional retard amount from the IVC timing before the retard should be set to become smaller as the IVC timing is more largely retarded with respect to the intake BDC. Specifically, in the specific operating region R having a risk of the occurrence of the preignition, the IVC timing in the normal state has a certain range, for example, of about 35±5 degrees CA ABDC. Thus, if the IVC timing before initiation of the retard is at 40 degrees CA ABDC, an additional retard amount from the IVC timing is set to a value less than that when the IVC timing is at 30 degrees CA ABDC. This makes it possible to maintain a reduction of the effective compression ratio at a constant value, irrespective of the IVC timing in the normal state.

In the above embodiment, for example, as shown in FIG. 15A, a point of the fuel injection timing in the normal state where no preignition occurs is set at one point in the intake stroke (i.e., injection fuel is entirely injected in the intake stroke once). Alternatively, as long as the normal point of the fuel injection timing is in the intake stroke, the injection fuel may be injected in the intake stroke plural times in a split manner.

Figure 18A:
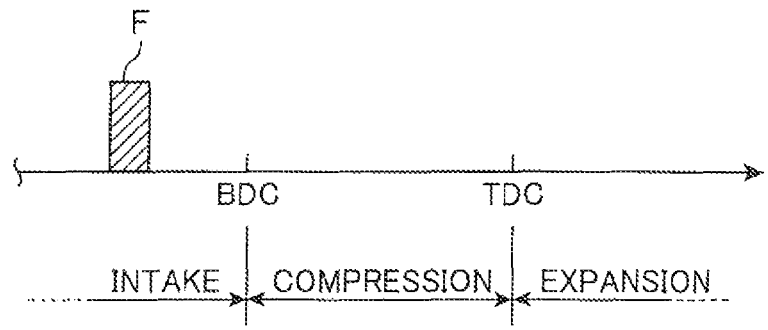
FIGS. 18A to 18C are explanatory diagrams showing various modified embodiments of the present invention.
Figure 18B:
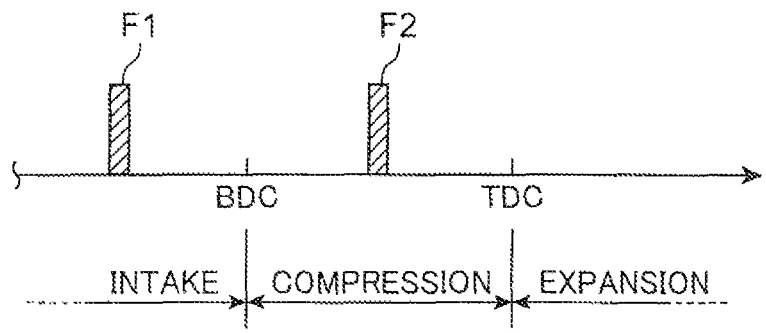
Figure 18C:
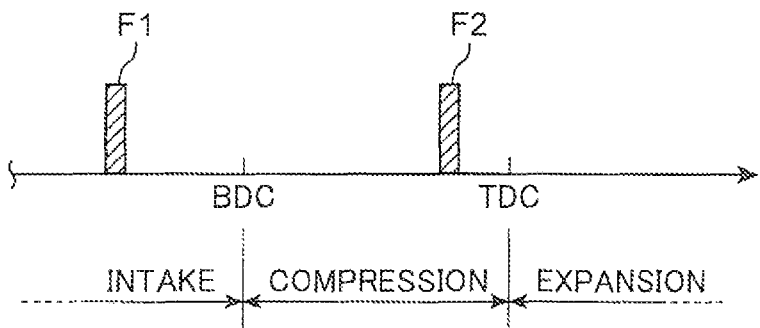

In the above embodiment, when the preignition is detected, the air/fuel ratio enrichment and the effective compression ratio reduction are executed in this order. Then, when the preignition cannot be avoided even after the two operations, an injection timing of a part of injection fuel is retarded to the later phase of the compression stroke (FIG. 15B). Alternatively, as shown in FIGS. 18A to 18C, a second injection F2 (hereinafter referred to as "post-injection") to be retarded at once to the compression stroke may be retarded to medium to later phases of the compression stroke in a multi-stage manner. Specifically, a timing of the post injection F2 is firstly retarded to the medium phase of the compression stroke (FIG. 18B). Then, when the preignition cannot be avoided after the first retard, the retarded timing of the post injection F2 is further retarded and set to the later phase of the compression stroke (FIG. 18C). Thus, in a situation where the preignition can be sufficiently avoided by retarding the timing of the post injection F2 to the medium phase of the compression stroke, the injection timing is never retarded at once to the later phase of the compression stroke where smoke is highly likely to occur, so that it becomes possible to more effectively avoid the deterioration in emission performance.

Conversely, depending on engine characteristics, a situation may occur where there the preignition cannot be avoided even after retarding the timing of the post-injection F2 to the later phase of the compression stroke. In such a situation, for example, the air/fuel ratio may be changed to a rich side (e.g., about 10) richer than the A/F limit value (11), while or after performing the control operation of retarding the timing of the post-injection F2 to the later phase of the compression stroke. In this case, although smoke is apt to temporally occur, it becomes possible to reliably avoid the preignition even when it fairly develops.

In the above embodiment, the control operation of retarding an injection timing of a part of injection fuel (post-injection F2) to the compression stroke in a split manner is executed, and then, when the preignition is successfully avoided as a result of the control operation, the injection timing retarded to the compression stroke for the part of injection fuel is immediately returned to a normal timing (in the intake stroke). Alternatively, a fuel injection timing after avoiding the preignition may be returned to at least an advance side (toward the intake stroke), and may be advanced to the normal timing in a multi-stage manner.

In the above embodiment, as the preignition avoidance control, the air/fuel ratio enrichment (S42), the effective compression ratio reduction (S43) and the compression stroke injection (split fuel injection) (S44) are executed in this priority order to lower an in-cylinder temperature and an in-cylinder pressure. Alternatively, any other suitable control other than the three types of controls may be employed, as long as it is capable of reducing at least one of the in-cylinder temperature and the in-cylinder pressure. For example, a cooling device for cooling intake air may be provided in the intake passage 20 to introduce intake air cooled by the cooling device, into the combustion chamber 6.

In the above embodiment, the ion current sensor 34 is provided as a separate component from the spark plug 16, and a flame formation timing is detected by the ion current sensor 34, to determine whether the preignition occurs. Alternatively, the spark plug 16 may be additionally used as the ion current sensor 34 by modifying the spark plug 16 to allow a center electrode (plug electrode) thereof to be applied with a bias voltage for ion current detection. This makes it possible to facilitate simplification of a control mechanism, and cut a cost required for the ion current sensor 34.

In cases where the spark plug 16 is also used as the ion current sensor 34 in the above manner, during a period where a spark is discharged from the spark plug 16 (i.e., a period where a high discharge voltage is applied to the spark electrode), the bias voltage cannot be applied to the plug electrode, and thereby it becomes impossible to detect an ion current, so that preignition detection accuracy of the ion current sensor 34 itself will deteriorate. However, in the spark-ignition engine according to the above embodiment designed to allow the preignition to be detected using the vibration sensor 33, the deterioration of detection accuracy can be covered by the vibration sensor 33, so that it becomes possible to facilitate simplification of the control mechanism and a reduction in component cost without deterioration in preignition detection accuracy.

The spark-ignition engine according to the above embodiment is designed to detect the occurrence of the preignition using both the ion current sensor 34 and the vibration sensor 33. Alternatively, the function of detecting the preignition using the ion current sensor 34 may be omitted. In this case, the occurrence of the preignition is detected only by the vibration sensor 33, so that it becomes possible to further simplify the control mechanism and scheme and further reduce the component cost.

In the above embodiment, vibration of the engine body 1 is detected using the vibration sensor 33, and it is determined which of the preignition and the knocking occurs, based on in what manner a magnitude and a detection timing of a maximum vibration intensity Vmax identified by a detection value of the vibration is changed along with retard of a spark timing. This detection technique can be applied to an abnormal combustion detection method using an in-cylinder pressure sensor for detecting an in-cylinder pressure of a spark-ignition engine.

Specifically, the preignition and the knocking are detected using the in-cylinder pressure, in the following manner. When the engine operating state is in the specific operating region R, based on a waveform (see, for example, FIG. 5) of an in-cylinder pressure input from the in-cylinder pressure sensor, a maximum value of the in-cylinder pressure is firstly identified. Then, it is determined whether the maximum value is equal to or greater than a given threshold value. When the maximum value is equal to or greater than the threshold value, the spark timing is retarded, and a maximum value of an in-cylinder pressure after the spark timing retard is further acquired. Then, it is determined whether a post-spark retard maximum in-cylinder pressure is greater than a pre-spark retard maximum in-cylinder pressure, where: the post-spark retard maximum in-cylinder pressure (which corresponds to "post-spark retard maximum detection value" set forth in the appended claims) is the maximum value of the in-cylinder pressure acquired after the spark timing retard; and the pre-spark retard maximum in-cylinder pressure (which corresponds to "pre-spark retard maximum detection value" set forth in the appended claims) is the maximum value of the in-cylinder pressure acquired before the spark timing retard. When the post-spark retard maximum in-cylinder pressure is greater than the pre-spark retard maximum in-cylinder pressure, it is determined that the preignition occurs.

Preferably, when a detection timing of the post-spark retard maximum in-cylinder pressure is earlier than a detection timing of the pre-spark retard maximum in-cylinder pressure, it is determined that the preignition occurs, even if a magnitude of the post-spark retard maximum in-cylinder pressure is equal to or less than a magnitude of the pre-spark retard maximum in-cylinder pressure, as with the above embodiment. On the other hand, when the detection timing of the post-spark retard maximum in-cylinder pressure is not earlier than the detection timing of the pre-spark retard maximum in-cylinder pressure, it is determined that the preignition occurs, (7) Outline An outline of features and effects of the invention disclosed based on the above embodiment will be described below.

The present invention provides a method for detecting abnormal combustion in a spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center, in a low engine speed/high engine load region and in a normal state where no abnormal combustion occurs. The method comprises the steps of: determining whether a maximum value of a vibration intensity acquired from the vibration sensor or a maximum value of an in-cylinder pressure acquired from the in-cylinder pressure sensor, in the low engine speed/high engine load region, is equal to or greater than a given threshold value; when the maximum value of the vibration intensity or the maximum value of the in-cylinder pressure is equal to or greater than the threshold value, shifting the spark timing of the spark plug from the point set in the normal state on the retard side with respect to the compression top dead center, farther toward the retard side; and when a post-spark retard maximum detection value is greater than a pre-spark retard maximum detection value, determining that preignition occurs which is a phenomenon that an air-fuel mixture prematurely self-ignites, where: the post-spark retard maximum detection value is the maximum value of the vibration intensity or the maximum value of the in-cylinder pressure, which is acquired from the vibration sensor or the in-cylinder pressure sensor after the retard of the spark timing; and the pre-spark retard maximum detection value is the maximum value of the vibration intensity or the maximum value of the in-cylinder pressure, which is acquired before the retard of the spark timing.

The present invention also provides a spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center, in a low engine speed/high engine load region and in a normal state where no abnormal combustion occurs. The spark-ignition engine comprises a controller operable to control the spark timing of the spark plug and accept information about a vibration intensity detected by the vibration sensor or information about an in-cylinder pressure detected by the in-cylinder pressure sensor. The controller is operable, when a maximum value of the vibration intensity acquired from the vibration sensor or a maximum value of the in-cylinder pressure acquired from the in-cylinder pressure sensor, in the low engine speed/high engine load region, is equal to or greater than a given threshold value, to execute a control operation of shifting the spark timing of the spark plug from the point set in the normal state on the retard side with respect to the compression top dead center, farther toward the retard side. And the controller is operable, when a post-spark retard maximum detection value is greater than a pre-spark retard maximum detection value, to determine that preignition occurs which is a phenomenon that an air-fuel mixture prematurely self-ignites, where: the post-spark retard maximum detection value is the maximum value of the vibration intensity or the maximum value of the in-cylinder pressure, which is acquired from the vibration sensor or the in-cylinder pressure sensor after the retard of the spark timing; and the pre-spark retard maximum detection value is the maximum value of the vibration intensity or the maximum value of the in-cylinder pressure, which is acquired before the retard of the spark timing.

In the present invention, a maximum value of a vibration intensity or a maximum value of an in-cylinder pressure is acquired using the vibration sensor or the in-cylinder pressure sensor, and, when the maximum value is equal to or greater than a given threshold value, the spark timing is retarded. Then, the presence or absence of the preignition is determined based on whether a maximum value of a vibration intensity or in-cylinder pressure after the retard (post-spark retard maximum detection value) is greater than the maximum value of the vibration intensity or in-cylinder pressure before the retard (pre-spark retard maximum detection value). This provides an advantage of reliably detecting the preignition while distinguishing it from knocking, even if the preignition is in a relatively early stage, and has not so seriously developed.

For example, even if a vibration intensity or in-cylinder pressure is simply compared with a reference value, it is difficult to determine which of the preignition and the knocking occurs, particularly, when the preignition is in a relatively early stage. As measures against this problem, in the present invention, when a maximum detection value (a maximum value of vibration intensity or in-cylinder pressure) of the vibration sensor or in-cylinder pressure sensor is equal to or greater than a given threshold value, the spark timing is intentionally retarded. Then, when an increase in the maximum detection value is ascertained between before and after the spark timing retard, it is determined that the preignition occurs. Specifically, the spark timing retard is effective only in suppressing the knocking (ineffective in suppressing the preignition). Based on this characteristic, the preignition and the knocking can be accurately distinguished from each other by analyzing a change in the maximum detection value after the spark timing retard.

Preferably, in the method of the present invention, when a detection timing of the post-spark retard maximum detection value is earlier than a detection timing of the pre-spark retard maximum detection value, it is determined that the preignition occurs, even if the post-spark retard maximum detection value is equal to or less than the pre-spark retard maximum detection value.

Preferably, the spark-ignition engine of the present invention, the controller is operable, when a detection timing of the post-spark retard maximum detection value is earlier than a detection timing of the pre-spark retard maximum detection value, to determine that the preignition occurs, even if the post-spark retard maximum detection value is equal to or less than the pre-spark retard maximum detection value.

The preignition will gradually develop, irrespective of the spark timing retard. Thus, once the preignition occurs, a combustion initiation timing will become earlier with time. According to the above features, based on this characteristic, when a detection timing of the maximum detection value becomes earlier, it is determined that the preignition occurs, even if no increase in the maximum detection value of the vibration sensor or in-cylinder pressure sensor is observed. This makes it possible to enhance detection accuracy of the preignition.

Preferably, in the method of the present invention, the engine is provided with an ion current sensor for detecting a flame resulting from combustion of an air-fuel mixture. The method comprises a step of determining the presence or absence of the preignition based on a detection timing of the flame by the ion current sensor, wherein, when it is ascertained, based on the vibration sensor or the in-cylinder pressure sensor, that the post-spark retard maximum detection value is greater than the pre-spark retard maximum detection value, it is determined that the preignition occurs, even if it is ascertained that no preignition occurs, as a result of the determination based on the ion current sensor.

Preferably, the spark-ignition engine of the present invention comprises an ion current sensor for detecting a flame resulting from combustion of an air-fuel mixture. The controller is operable to determine the presence or absence of the preignition based on a detection timing of the flame by the ion current sensor, and, when it is ascertained, based on the vibration sensor or the in-cylinder pressure sensor, that the post-spark retard maximum detection value is greater than the pre-spark retard maximum detection value, to determine that the preignition occurs, even if it is ascertained that no preignition occurs, as a result of the determination based on the ion current sensor.

As in the above features, in a double detection system using a combination of the ion current sensor and the vibration sensor or in-cylinder pressure sensor, even if a failure such as disconnection occurs in the ion current sensor or the ion current sensor has poor detection accuracy, the preignition can be detected using the vibration sensor or in-cylinder pressure sensor, and further enhance preignition detection accuracy.

Preferably, in the spark-ignition engine of the present invention, the controller is operable, when it is determined that the preignition occurs, to execute a given control operation of lowering at least one of an in-cylinder temperature and an in-cylinder pressure of the engine.

In this feature, when the preignition occurs, at least one of the in-cylinder temperature and the in-cylinder pressure is lowered, which provides an advantage of being able to effectively suppress the preignition.

A control operation of primarily lowering the in-cylinder temperature may include a control operation of enriching an air/fuel ratio, and a control operation of injecting at least a part of injection fuel in a compression stroke. A control operation of primarily lowering the in-cylinder pressure may include a control operation of changing a closing timing of an intake valve to reduce an effective compression ratio. At least one of the in-cylinder temperature and the in-cylinder pressure can be lowered by executing one or a combination of two or more of the above control operation.

This application is based on Japanese patent application No. 2010-080943, filed in Japan Patent Office on Mar. 31, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center, in a low engine speed/high engine load region and in a normal state where no abnormal combustion occurs, wherein:

the spark-ignition engine comprises a controller operable to control the spark timing of the spark plug and accept information about a vibration intensity detected by the vibration sensor or information about an in-cylinder pressure detected by the in-cylinder pressure sensor; and the controller is operable:

when a maximum value of the vibration intensity acquired from the vibration sensor or a maximum value of the in-cylinder pressure acquired from the in-cylinder pressure sensor, in the low engine speed/high engine load region, is equal to or greater than a given threshold value, to execute a control operation of shifting the spark timing of the spark plug from the point set in the normal state on the retard side with respect to the compression top dead center, farther toward the retard side; and when a post-spark retard maximum detection value is greater than a pre-spark retard maximum detection value, to determine that preignition occurs which is a phenomenon that an air-fuel mixture prematurely self-ignites, where: the post-spark retard maximum detection value is the maximum value of the vibration intensity or the maximum value of the in-cylinder pressure, which is acquired from the vibration sensor or the in-cylinder pressure sensor after the retard of the spark timing; and the pre-spark retard maximum detection value is the maximum value of the vibration intensity or the maximum value of the in-cylinder pressure, which is acquired before the retard of the spark timing.

2. The spark-ignition engine as defined in claim 1, wherein the controller is operable, when a detection timing of the post-spark retard maximum detection value is earlier than a detection timing of the pre-spark retard maximum detection value, to determine that the preignition occurs, even if the post-spark retard maximum detection value is equal to or less than the pre-spark retard maximum detection value.

3. The spark-ignition engine as defined in claim 1, further comprising an ion current sensor for detecting a flame resulting from combustion of an air-fuel mixture,
wherein the controller is operable:
to determine the presence or absence of the preignition based on a detection timing of the flame by the ion current sensor; and
when it is ascertained, based on the vibration sensor or the in-cylinder pressure sensor, that the post-spark retard maximum detection value is greater than the pre-spark retard maximum detection value, to determine that the preignition occurs, even if it is ascertained that no preignition occurs, as a result of the determination based on the ion current sensor.

4. The spark-ignition engine as defined in claim 1, wherein the controller is operable, when it is determined that the preignition occurs, to execute a given control operation of lowering at least one of an in-cylinder temperature and an in-cylinder pressure of the engine.

5. A method for detecting abnormal combustion in a spark-ignition engine which is provided with a vibration sensor for detecting vibration of the engine, or an in-cylinder pressure sensor for detecting an in-cylinder pressure of the engine, and designed such that a spark timing of a spark plug is set on a retard side with respect to a compression top dead center, in a low engine speed/high engine load region and in a normal state where no abnormal combustion occurs, the method comprising the steps of:
determining whether a maximum value of a vibration intensity acquired from the vibration sensor or a maximum value of an in-cylinder pressure acquired from the in-cylinder pressure sensor, in the low engine speed/high engine load region, is equal to or greater than a given threshold value;
when the maximum value of the vibration intensity or the maximum value of the in-cylinder pressure is equal to or greater than the threshold value, shifting the spark timing of the spark plug from the point set in the normal state on the retard side with respect to the compression top dead center, farther toward the retard side; and
when a post-spark retard maximum detection value is greater than a pre-spark retard maximum detection value, determining that preignition occurs which is a phenomenon that an air-fuel mixture prematurely self-ignites, where: the post-spark retard maximum detection value is the maximum value of the vibration intensity or the maximum value of the in-cylinder pressure, which is acquired from the vibration sensor or the in-cylinder pressure sensor after the retard of the spark timing; and the pre-spark retard maximum detection value is the maximum value of the vibration intensity or the maximum value of the in-cylinder pressure, which is acquired before the retard of the spark timing.

6. The method as defined in claim 5, wherein, when a detection timing of the post-spark retard maximum detection value is earlier than a detection timing of the pre-spark retard maximum detection value, it is determined that the preignition occurs, even if the post-spark retard maximum detection value is equal to or less than the pre-spark retard maximum detection value.

7. The method as defined in claim 5, wherein:
the engine is provided with an ion current sensor for detecting a flame resulting from combustion of an air-fuel mixture;
the method comprises a step of determining the presence or absence of the preignition based on a detection timing of the flame by the ion current sensor; and
when it is ascertained, based on the vibration sensor or the in-cylinder pressure sensor, that the post-spark retard maximum detection value is greater than the pre-spark retard maximum detection value, it is determined that the preignition occurs, even if it is ascertained that no preignition occurs, as a result of the determination based on the ion current sensor.

* * * * *